United States Patent
Ho et al.

(10) Patent No.: US 7,036,208 B2
(45) Date of Patent: May 2, 2006

(54) SELF ALIGNED MAGNETORESISTIVE FLUX GUIDE READ HEAD WITH EXCHANGE BIAS UNDERNEATH FREE LAYER

(75) Inventors: Kuok San Ho, Cupertino, CA (US); Tao Pan, San Jose, CA (US)

(73) Assignee: Hitachi Global StorageTechnologies Netherlands B.V, Amsterdam (NL)

( * ) Notice: Subject to any disclaimer, the term of this patent is extended or adjusted under 35 U.S.C. 154(b) by 130 days.

(21) Appl. No.: 10/675,514

(22) Filed: Sep. 30, 2003

(65) Prior Publication Data

US 2004/0061979 A1    Apr. 1, 2004

Related U.S. Application Data

(62) Division of application No. 09/922,446, filed on Aug. 2, 2001, now Pat. No. 6,657,825.

(51) Int. Cl.
   *G11B 5/127*   (2006.01)
   *H04R 31/00*   (2006.01)

(52) U.S. Cl. .............................. 29/603.13; 29/603.14; 29/603.15; 29/603.16; 29/603.18; 216/39; 216/41; 360/318; 360/321; 360/324; 360/325; 360/326; 360/327; 365/158; 365/173; 427/127; 427/128

(58) Field of Classification Search ..............................
   29/603.13–603.17; 360/318, 321, 324–327; 365/158, 173; 216/39, 41; 427/127, 128
   See application file for complete search history.

(56) References Cited

U.S. PATENT DOCUMENTS

| | | | |
|---|---|---|---|
| 4,663,685 A | 5/1987 | Tsang | 360/113 |
| 5,650,958 A | 7/1997 | Gallagher et al. | 365/173 |
| 5,712,565 A | 1/1998 | Schultz et al. | 324/252 |

(Continued)

FOREIGN PATENT DOCUMENTS

EP           918319 A1 * 5/1999

OTHER PUBLICATIONS

"Evaluation of front flux guide-type magnetic tunnel junction"; Shimazawa, K.; Redon, O.; Kasahara, N.; Sun, J.J.; Sato, K.; Kagami, T.; Saruki, S.; Umehara, T.; Fujita, Y.; Yarimizu, S.; Araki, S.; Morita, H.; Matsuzaki, M.; Magnetics, IEEE Tranactions on vol. 36, Issue 5, Sep. 2000 Page(s):2542-2544.*

Primary Examiner—Paul D. Kim
(74) Attorney, Agent, or Firm—Walter W. Duft

(57) ABSTRACT

A magnetoresistive sensor for use in a data storage device has a recessed sensing element (magnetic tunnel junction, CPP spin valve, etc.) with an exchange biased sensing ferromagnetic (free) layer, and a flux guide that magnetically connects the sensing element to a sensing surface of the sensor. The free layer is selectively exchange biased by a layer of exchange bias material placed under non-active regions of the free layer that lie outside the sensing element and flux guide track widths. The flux guide is provided by extending the free layer from a forward edge of the sensing element to the sensor surface. Advantageously, the sensing element and the flux guide have equal track width so that magnetic flux directed from the flux guide into the sensing element is not diluted with consequent loss of sensitivity.

7 Claims, 23 Drawing Sheets

U.S. PATENT DOCUMENTS

| | | | |
|---|---|---|---|
| 5,712,612 A | 1/1998 | Lee et al. | 338/32 |
| 5,729,410 A | 3/1998 | Fontana, Jr. et al. | 360/113 |
| 5,739,987 A | 4/1998 | Yuan et al. | 360/113 |
| 5,764,445 A | 6/1998 | Torng et al. | 360/113 |
| 5,780,176 A | 7/1998 | Iwasaki et al. | 428/962 |
| 5,867,889 A | 2/1999 | Dovek et al. | 29/603.13 |
| 5,898,547 A | 4/1999 | Fontana, Jr. et al. | 360/113 |
| 5,901,018 A | 5/1999 | Fontana, Jr. et al. | 360/114 |
| 5,909,344 A | 6/1999 | Gill | 360/113 |
| 5,910,344 A | 6/1999 | Hasegawa et al. | 427/599 |
| 5,923,504 A * | 7/1999 | Araki et al. | 360/324.11 |
| 5,946,167 A | 8/1999 | Hara et al. | 360/113 |
| 5,949,623 A | 9/1999 | Lin | 360/113 |
| 5,966,012 A | 10/1999 | Parkin | 324/252 |
| 5,993,566 A | 11/1999 | Lin | 148/108 |
| 5,995,339 A | 11/1999 | Koshikawa et al. | 360/113 |
| 6,005,753 A | 12/1999 | Fontana et al. | 360/113 |
| 6,023,395 A | 2/2000 | Dill et al. | 360/113 |
| 6,030,753 A | 2/2000 | Lin | 430/314 |
| 6,033,491 A | 3/2000 | Lin | 148/108 |
| 6,052,261 A | 4/2000 | Watanabe et al. | 360/113 |
| 6,052,263 A | 4/2000 | Gill | 360/113 |
| 6,223,420 B1 * | 5/2001 | Lee et al. | 29/603.14 |
| 6,680,830 B1 * | 1/2004 | Gill | 360/321 |
| 6,788,502 B1 * | 9/2004 | Gill | 360/324.2 |

* cited by examiner

SELF ALIGNED MAGNETORESISTIVE FLUX GUIDE READ HEAD WITH EXCHANGE BIAS UNDERNEATH FREE LAYER

This application is a divisional of application Ser. No. 09/922,446, filed on Aug. 2, 2001, now U.S. Pat. No. 6,657,825.

BACKGROUND OF THE INVENTION

1. Field of the Invention

The present invention relates to magnetoresistive sensors for reading magnetically-recorded information from data storage media, and particularly to MTJ (Magnetic Tunnel Junction and CPP (Current-Perpendicular-to-Plane) spin valve read sensors for direct access storage device (DASD) systems.

2. Description of the Prior Art

By way of background, MTJ and CPP spin valve devices have been proposed for use as magnetic field sensors (e.g., read head sensors) in DASD systems, such as disk drives. An MTJ sensor is a variable current device formed by a magnetically pinned ferromagnetic layer and a magnetically free ferromagnetic layer separated by an intervening tunnel barrier layer. The barrier layer is made from a material that is electrically insulating but thin enough to pass charge carriers via a quantum mechanical phenomenon known as electron spin tunneling. Electrical leads and/or shields are positioned to make electrical contact with the ferromagnetic layers and induce a sense current that passes perpendicularly through the tunnel barrier layer from the pinned ferromagnetic layer to the free layer. Because the tunneling phenomenon is electron-spin dependent, the electrical resistance across the barrier layer is related to the spin polarity of the tunneling current, which in turn is a function of the alignment of the magnetic moment (magnetization directions) of the free layer relative to that of the pinned layer. The electron tunneling probability is highest when the magnetic moments are parallel and lowest when the magnetic moments are antiparallel. Because the magnetic moment of the free layer can be influenced by an external magnetic field, such as a magnetic domain on a data storage medium, an MTJ sensor's electrical resistance will vary as a function of the direction and magnitude of the recorded magnetic domains, which rotate the free layer's magnetic moment with respect to the relatively fixed magnetic moment of the pinned layer.

A CPP spin valve sensor is generally similar in construction to an MTJ sensor except that the tunnel barrier layer is replaced with an electrically conductive barrier layer. The CPP spin valve sensor thus comprises a stacked array of a pinned ferromagnetic layer, an electrically conductive metallic barrier layer, and a free ferromagnetic layer, sandwiched between a pair of electrical leads and/or shields. Like an MTJ sensor, electrical current in a CPP spin valve sensor is passed perpendicularly to the planes of the stacked array layers, and electrical resistance is measured. The sensor readback signal is a function of the resistance changes that result when the magnetic moment of the free layer rotates relative to the pinned layer magnetic moment under the influence of recorded magnetic domains. Resistance is lower when the relative magnetic moments are parallel and higher when the magnetic moments are antiparallel. Because of their superior sensitivity, CPP spin valves are generally preferred over CIP (Current-In-Plane) spin valves.

Commonly assigned U.S. Pat. No. 5,898,547 of Fontana et al. (the '547 patent), discloses a magnetoresistive read head (with an MTJ sensing element) for use in an integrated read/write head of a disk drive. The sensing element of the read head is recessed from the sensing surface of the head to minimize damage to the sensing element layers during lapping. A flux guide is formed as an extension of the sensing element free layer and carries magnetic flux from the sensing surface to the sensing element.

A disadvantage of the read head of the '547 patent is that the flux guide and the sensing element structures are defined by separate photo processing operations, and the flux guide has a track width which is narrower than that of the sensing element. It is believed that this reduces read sensitivity because the magnetic flux carried from the narrower track width of the flux guide into the wider track width of the sensing element device becomes diluted.

Another disadvantage of the read head of the '547 patent stems from the use of hard biasing material to longitudinally bias the sensing element free layer for noise reduction and improvement of signal-to-noise characteristics. In the disclosed read head, the direction of longitudinal biasing is parallel to the sensing surface and across the track width of the free layer. The hard biasing material is disposed on either side of the track width boundaries of the free layer, but because it is electrically conductive, the biasing material must be spaced from the sensing element free layer and separated therefrom by an insulator. In order to have good insulating quality, the insulator must be relatively thick. Unfortunately, the required insulating thickness is sufficiently large that hard biasing effectiveness relative to the free layer is lost.

It is submitted that improvements in the design of magnetoresistive sensors, particularly recessed sensor devices of the type disclosed in the '547 patent, are needed in order to overcome the aforementioned disadvantages. What is required is an magnetoresistive sensor in which flux delivered to the sensing element is not diluted, and wherein increased longitudinal biasing strength is provided.

SUMMARY OF THE INVENTION

The foregoing problems are solved and an advance in the art is obtained by a novel magnetoresistive sensor for use in a data storage device. The sensor has a sensing ferromagnetic (free layer) that is selectively pinned using exchange biasing to define longitudinally biased magnetically responsive (active) free layer regions of a sensing element and a flux guide that magnetically connects the sensing element to a sensing surface of the sensor. The sensing element may be constructed as an MTJ device, a CPP spin valve device, or in accordance with any other suitable design. The sensing element and flux guide active free layer regions are longitudinally biased by placing a layer of exchange bias material under areas of the free layer that lie outside the track width boundaries of the sensing element, thereby pinning those areas and making them non-magnetically responsive (non-active). The sensing element and the flux guide preferably share common track width boundaries so that magnetic flux directed from the flux guide into the sensing element is not diluted with consequent loss of sensitivity. To that end, the flux guide can be formed by extending the sensing element active free layer region forwardly and rearwardly of the sensing element stripe height boundaries, such that the flux guide runs from the sensing surface of the sensor to a location that is rearward of the back edge of the sensing element. The sensing element also includes an electrically conductive fixed ferromagnetic layer (pinned layer) and a barrier layer disposed on the pinned layer. These are in addition to the aforementioned active free layer region, which is disposed on the barrier layer. First and second electrically conductive leads and/or shields are respectively disposed to provide an electrical current generally perpendicularly through the planes of the sensing element layers.

The invention further contemplates a disk drive and a read head that respectively incorporate a magnetoresistive sensor as summarized above. A method for fabricating the sensor is also provided. According to the inventive method, a multilayer wafer is formed that includes layers which will serve as the tunnel junction and the flux guide of the sensor. Common track width boundaries are defined for the sensing element and the flux guide in a single photo processing operation. As part of this operation, the portions of the free layer that comprise the sensing element and flux guide active free layer regions are completed, and the free layer non-active areas are exchanged biased outside the track width boundaries.

The wafer forming step of the inventive method preferably includes the formation of a wafer having an antiferromagnetic layer, a pinned layer, a barrier layer, a partial free layer (free sub-layer), and a cap layer. The photo processing operation includes applying a photoresist mask on the wafer to define the sensing element and flux guide track width boundaries. The cap layer, the partial free layer, the barrier layer and the pinned layer are then removed from areas thereof that lie outside of the track width boundaries to expose a corresponding area of the antiferromagnetic layer. An insulating layer is formed over the exposed area of the antiferromagnetic layer and an exchange bias layer is formed over the insulating layer. The photoresist mask and the cap layer are then removed to expose the partial free layer lying within the track width boundaries while leaving the exchange bias layer intact outside of the track width boundaries. Additional free layer material is then applied over the wafer, including the partial free layer and the exchange bias layer. This added free layer material completes the active free layer regions of the sensing element and the flux guide within the track width boundaries, and provides a pinned free layer outside of the track width boundaries that longitudinally exchange biases the active free layer regions to a selected magnetic orientation in the absence of an external magnetic field.

BRIEF DESCRIPTION OF THE DRAWING

The foregoing and other features and advantages of the invention will be apparent from the following more particular description of preferred embodiments of the invention, as illustrated in the accompanying Drawing, in which.

DETAILED DESCRIPTION OF PREFERRED EMBODIMENTS

Figure 1:
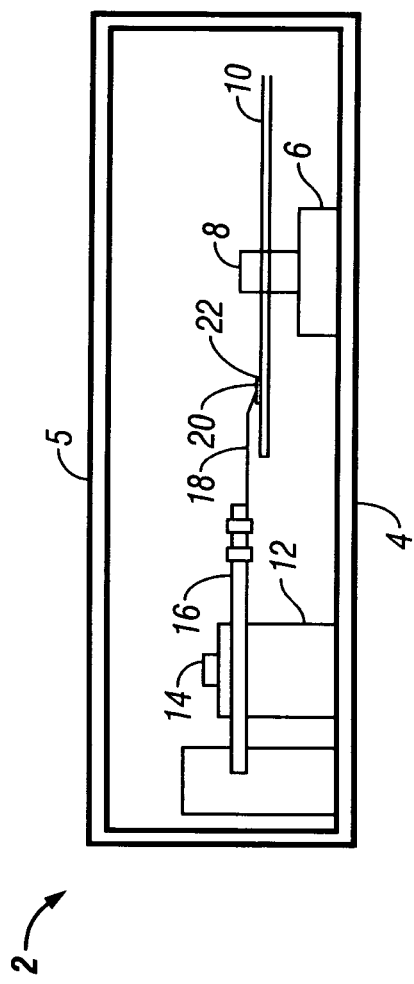
FIG. 1 is a simplified vertical sectional view of a magnetic disk drive that incorporates a magnetoresistive sensor according the present invention.
Figure 2:
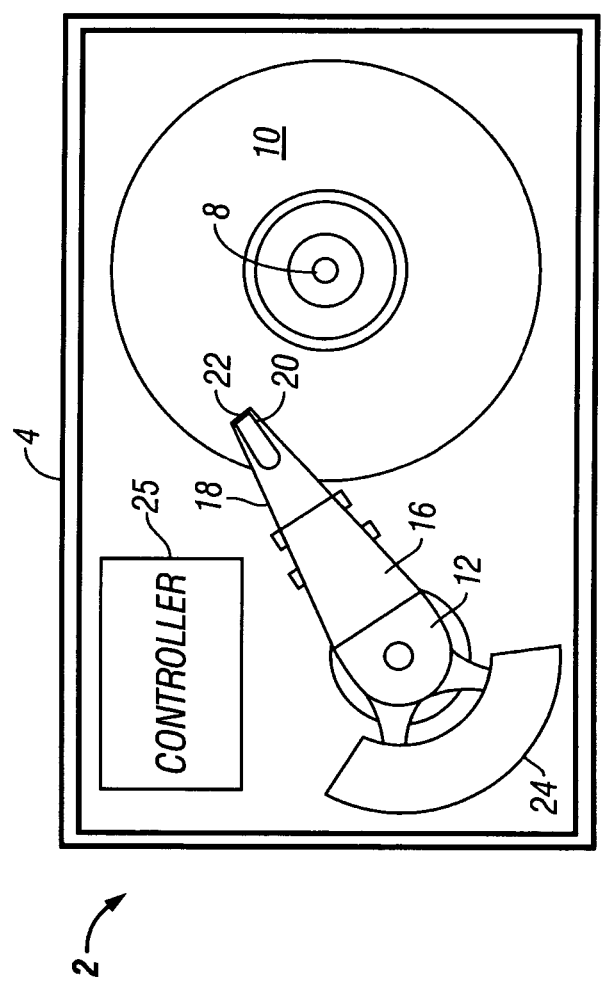
FIG. 2 is a simplified horizontal sectional view of the disk drive of FIG. 1.

Turning now to the figures, wherein like reference numerals represent like elements in all of the several views, FIGS. 1 and 2 illustrate an exemplary disk drive 2 that incorporates a magnetoresistive sensor in accordance with the invention. Note that the disk drive 2 is shown in greatly simplified schematic form, with only those construction details that are necessary for an understanding of the invention being represented. As to these illustrated components, it should be understood that all are conventional in nature unless otherwise indicated below.

The disk drive 2 conventionally includes a base casting 4 made from cast aluminum or other suitable material. A cover 5 is removably mounted thereto via a hermetic seal (not shown). The base casting 4 mounts a conventional spindle drive motor 6 having an associated drive spindle 8. The drive spindle 8 carries a disk 10 for high speed rotation therewith. Other disks (not shown) may also be carried on the drive spindle 8 to form a spaced vertically stacked disk platter arrangement. The disk 10 is made from a suitable material of a type usually found in magnetic disk drive assemblies. In particular, the disk 10 is formed from a suitable disk substrate with appropriate coatings being applied thereto such that at least one, and preferably both, of the upper and lower surfaces of the disk are magnetically encodable and aerodynamically configured for high speed interaction with a read/write transducer (described below).

Data access to the disk 10 is achieved with the aid of an actuator 12 that is mounted for rotation about a stationary pivot shaft 14. The actuator 12 includes a rigid actuator arm 16 that carries a flexible suspension 18. The suspension 18 in turn carries a slider 20 that mounts a transducer 22. As described below with reference to FIG. 3, the transducer 22 is an integrated read/write head that includes an inductive write head and a read head incorporating a magnetoresistive sensor according to the invention.

When the disk drive 2 is not operating, the suspension 18 provides a biasing force that urges the slider 20 onto the surface of the disk 10. During operation of the disk drive 2, the drive motor 6 spins up the disk 10 to a constant speed. This causes an air bearing to form under the slider 20, which spaces the transducer 22 slightly above the moving disk surface. The actuator 12, which is conventionally driven by a voice coil motor 24, moves the slider 20 generally radially across the surface of the disk 10 so that the transducer 22 is able to trace concentric data tracks on the disk.

Data recorded on the disk 10 is read by the transducer 22 and processed into a readback signal by signal amplification and processing circuitry (not shown) that is conventionally located on the actuator arm 16. The readback signal, which carries both data and transducer position control information, is sent to the drive controller 25 for conventional processing.

Figure 3:
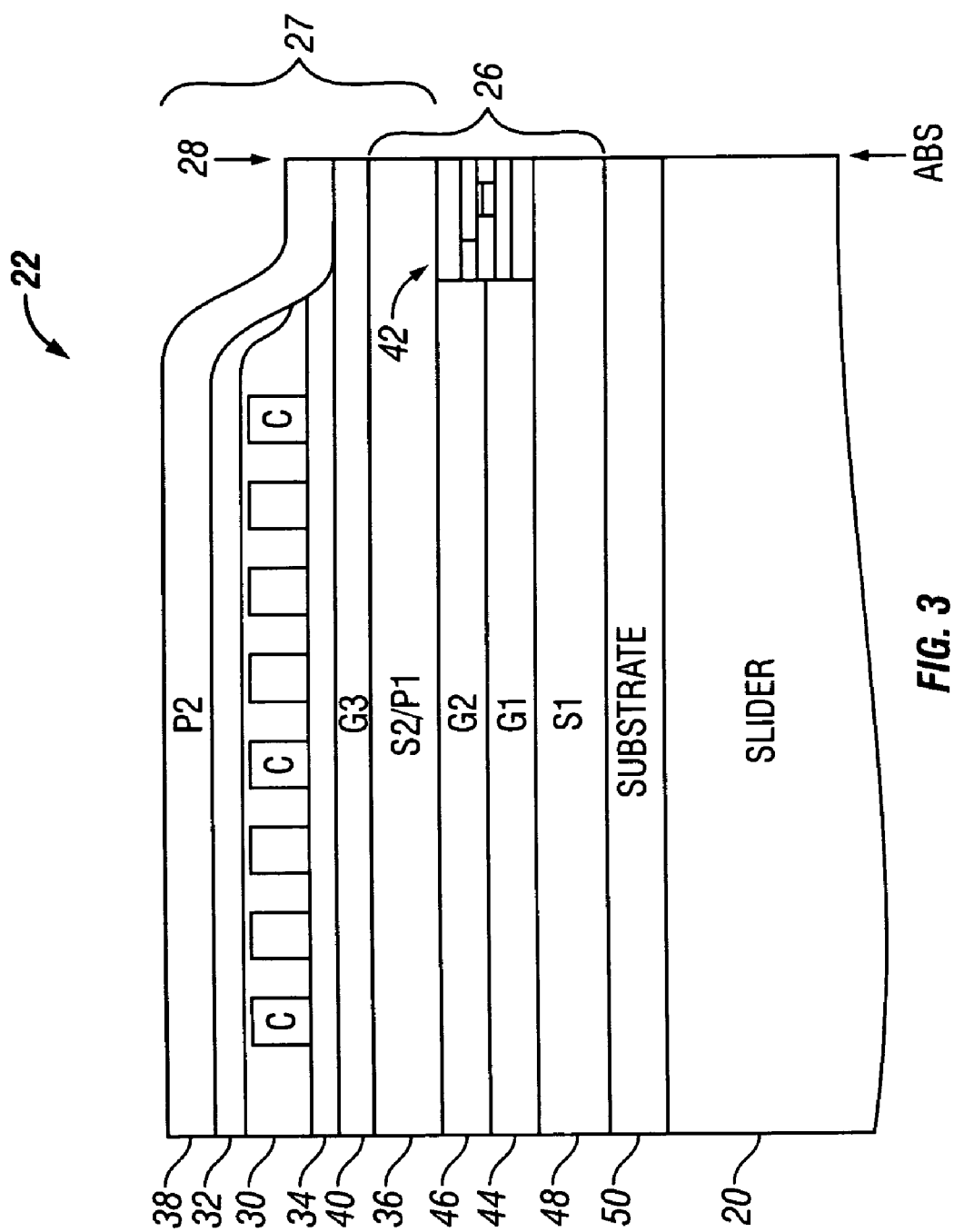
FIG. 3 is a vertical sectional view of an integrated read/write head that incorporates a magnetoresistive sensor according to the invention.

Turning now to FIG. 3, the magnetoresistive read head component of the transducer 22 is shown at 26 and the inductive write head portion of the transducer is shown at 27. The transducer is also shown as being lapped at 28 to form an air bearing surface (ABS) that is designed to be spaced from the rotating disk 10 during drive operation by virtue of the above-described air bearing.

The write head 24 conventionally includes a combined coil and insulation layer 30 that is sandwiched between insulation layers 32 and 34. The insulation layers 32 and 34 are in turn sandwiched between first (P1) and second (P2) pole pieces 36 and 38. A G3 gap layer 40 is sandwiched between the P1 and P2 pole pieces 36 and 38 at their pole tips adjacent to the ABS 28 for providing a magnetic write gap. During a data write operation, signal current is conducted through the coils C of the coil and insulation layer 30, and flux is induced into the P1 and P2 pole pieces 36 and 38. This flux fringes across the pole tips at the ABS 28 and forms magnetic domains on the rotating disk 10. As indicated above, these magnetic domains are arranged to define concentric tracks on the disk 10.

The read head 26 includes a magnetoresistive read sensor 42 disposed in adjacent G1 and G2 gap areas 44 and 46. The G1 and G2 gap areas 44 and 46 are in turn sandwiched between a first (S1) magnetic shield layer 48 and second (S2) magnetic shield layer that also forms the P1 pole layer 36. The S1 shield layer 48 can either be formed on a conventional substrate layer 50, made from silicon, a semiconductor, or other suitable material, that is in turn mounted to the slider 20. Alternatively, the S1 shield layer 48 can itself act as a support substrate for the read head 26. During a read operation, magnetized domains on the concentric tracks of the rotating disk 10 inject flux into the read sensor 42. This influences the magnetic orientation of the MTJ device to change direction, which causes resistance changes in the sensing circuit of the read sensor 42.

It will be appreciated that the foregoing detailed description of the disk drive 2 and the transducer 22 is exemplary in nature, and that many other design configurations would be possible while still incorporating a magnetoresistive sensor according to the invention. For example, the disk drive 2 may include a large number of disks and actuators, and each actuator may carry plural suspensions and multiple sliders. Moreover, instead of using an air bearing slider, an alternative transducer carrying structure may be used that maintains the transducer 22 in contact or near contact with the disk 10. The design of the transducer 22 could also be varied, as by incorporating multiple coil and insulation layers 30, or separating the layer 36 into separate S2 shield and P2 pole layers.

Figure 4:
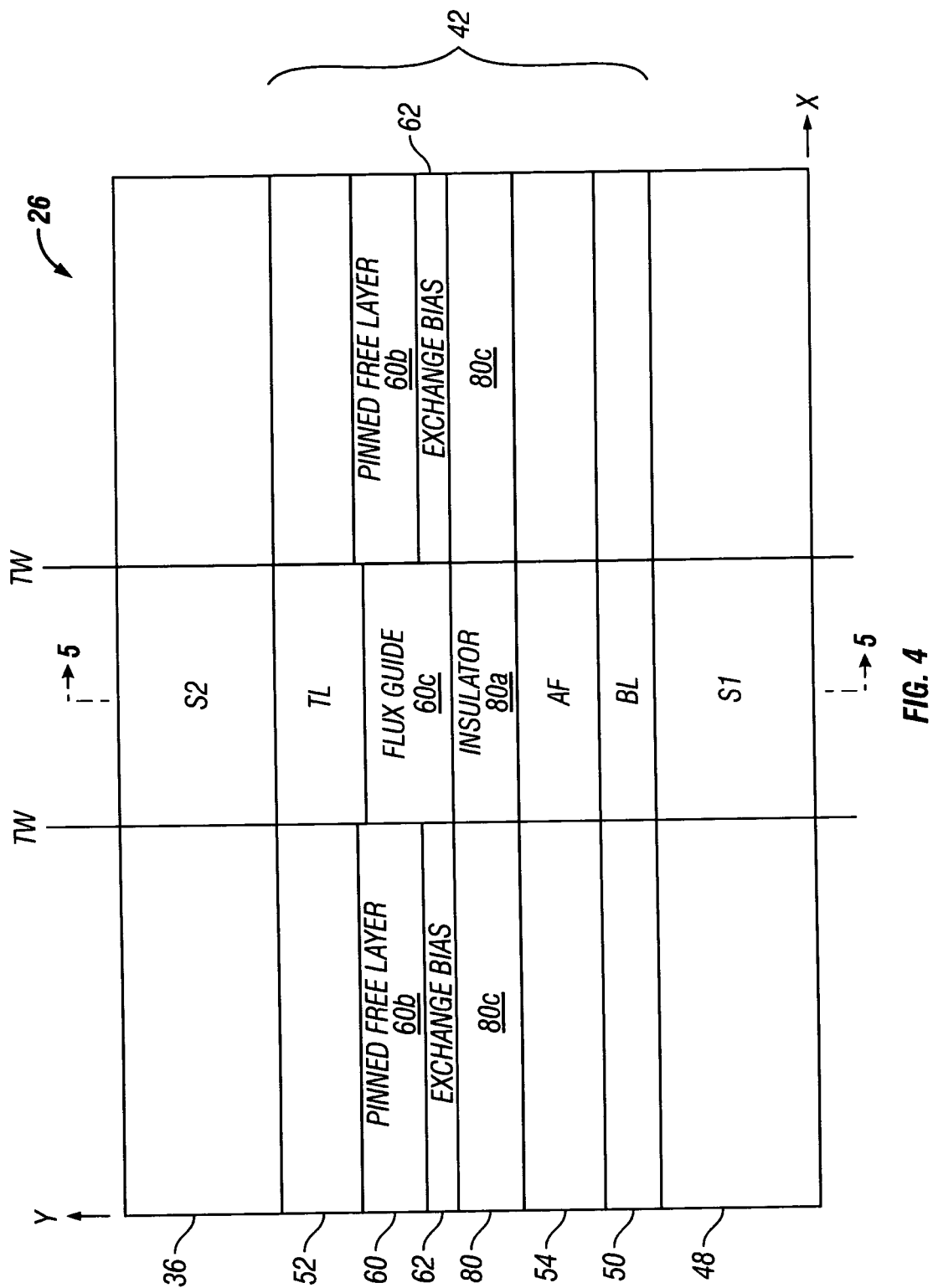
FIG. 4 is a diagrammatic view of the sensing surface of an exemplary MTJ magnetoresistive sensor according to the invention, looking from the viewpoint of a magnetic recording medium positioned under the sensor, and with the track width direction extending from left to right.
Figure 5:
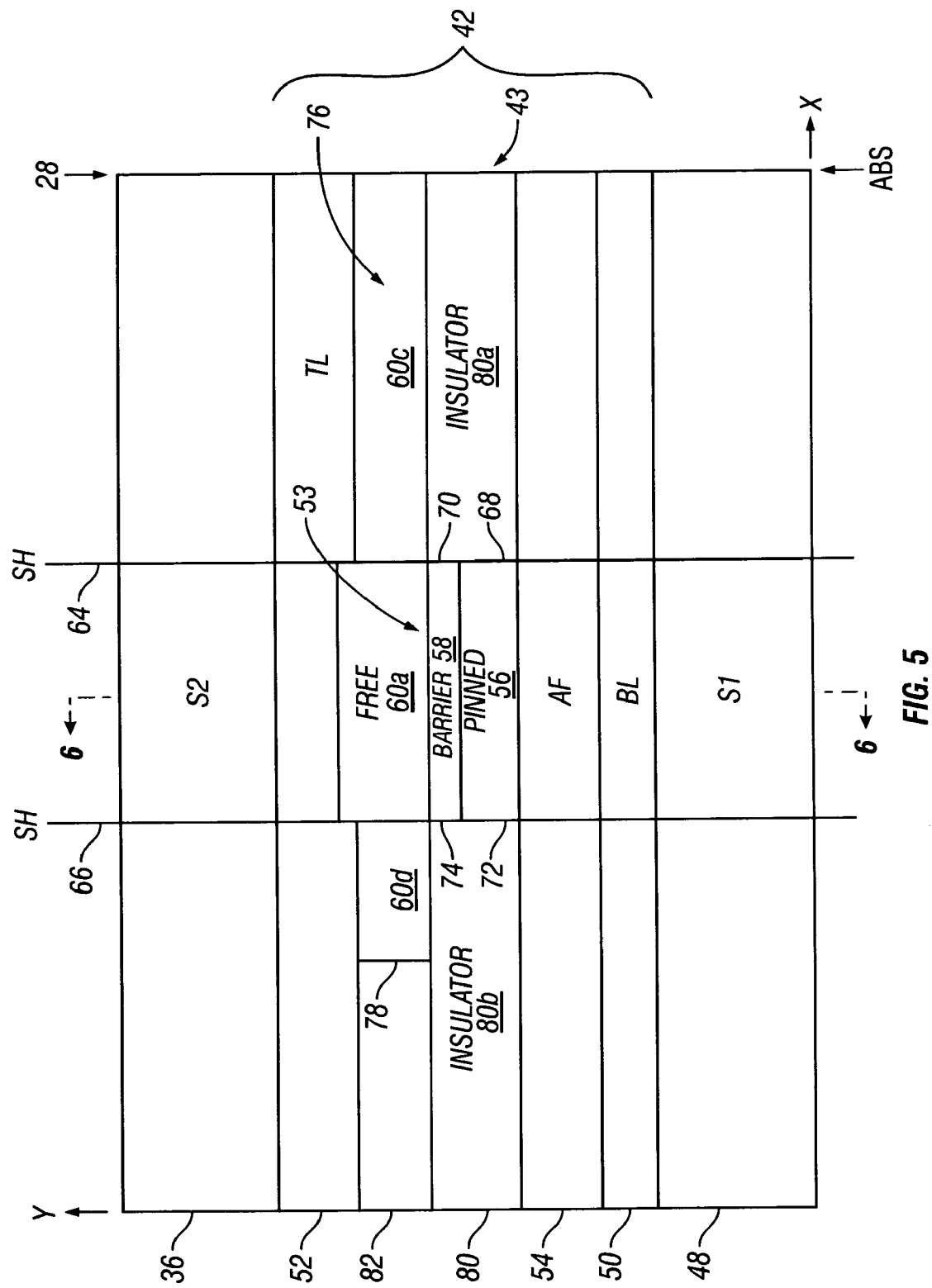
FIG. 5 is a cross-sectional view of the sensor of FIG. 4 taken along line 5—5 therein, and with the sensing surface being on the right side of the figure.
Figure 6:
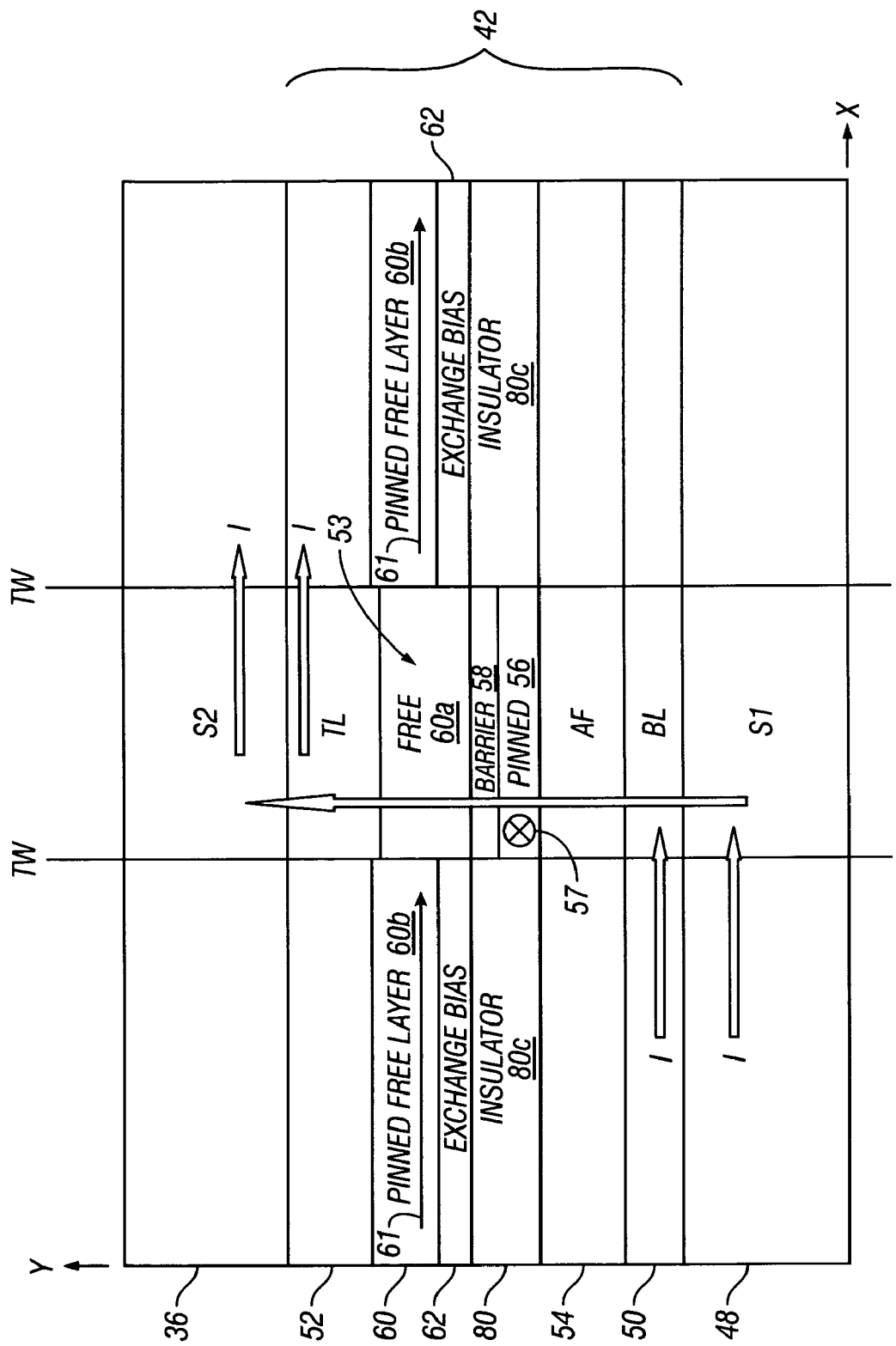
FIG. 6 is a cross-sectional view of the sensor of FIG. 4 taken along line 6—6 in FIG. 5, in a plane that is recessed from the sensing surface.

Turning now to FIGS. 4–6, the sensor 42 will be described in more detail, and by way of example only, in the context of an MTJ construction. FIG. 4 shows the sensor 42 from the viewpoint of the disk 10 looking toward the sensing surface of the sensor, which lies in the plane of the paper and is coincident with the ABS 28. The Ax@ axis in FIG. 4 represents the radial track width direction of a concentric track on the disk 10. The Ay@ axis in FIG. 4 represents the circumferential centerline direction of a concentric track on the disk 10. FIG. 5 shows the sensor 42 in a cross-sectional view taken along line 5—5 in FIG. 4. The sensing surface of the sensor 42 is on the right side of FIG. 5 and is shown at 43. During disk drive operation, the sensing surface 43 is closely spaced from the disk 10. The Ay@ axis in FIG. 5 is the same as in FIG. 4. The Az@ axis represents the direction pointing perpendicularly into the disk surface. FIG. 6 shows the sensor 42 in a cross-sectional view taken along line 6—6 in FIG. 5. FIG. 6 has the same orientation as FIG. 4 but is recessed from the sensing surface 43 to better show the MTJ device layers of the sensor 42. Note that the lines labeled TW in FIGS. 4 and 6 define the track width boundaries of the MTJ portion of the sensor 42. The lines labeled SH in FIG. 5 define the stripe height boundaries of the MTJ portion of the sensor 42.

It will be seen in FIGS. 4–6 that the sensor 42 has multiple layers disposed between the S1 shield layer 48 and the S2 shield layer(/P2 pole layer) 36 of FIG. 3. These layers may include a bottom electrical lead layer 50 that is adjacent to the S1 shield layer 48, and a top electrical lead layer 52 that is adjacent the S2 shield layer(/P2 pole layer) 36. Note that the electrical lead layers 50 and 52 are optional insofar as electrical current may be passed directly through the shield layers 36 and 48. Sandwiched between the bottom lead layer 50 and the top lead layer 52 are the layers that define the MTJ portion of the sensor 42, which is shown generally at 53 in FIGS. 5 and 6. In particular, there is disposed on the bottom lead layer 50 an antiferromagnetic layer 54 that exchange biases an overlying ferromagnetic layer 56, making layer 56 the pinned layer of the MTJ 53. According to conventional MTJ design, the magnetization direction of the pinned layer 56 is sufficiently fixed by the exchange biasing antiferromagnetic layer 54 to prevent rotation thereof in the presence of external magnetic fields, such as magnetic domains recorded on the disk 10. The magnetization direction of the pinned layer 56 points either into or out of the plane of FIG. 6, such that it is oriented generally perpendicular to the sensing surface 43. The arrow tail 57 illustrates an exemplary configuration where the magnetization direction is into the plane of FIG. 6. An MTJ barrier layer 58 overlies the pinned layer 56. Above the barrier layer 58 is another ferromagnetic layer 60 (free layer).

As shown in FIGS. 5 and 6, the free layer 60 has a central portion 60a lying between the MTJ track width and stripe height boundaries TW and SH. The free layer central portion 60a forms the magnetically responsive (active) free layer region of the MTJ 53.

As shown in FIGS. 4 and 6, the free layer 60 further includes a pair of lateral portions 60b lying outside the MTJ track width boundaries TW. The lateral portions 60b of the free layer 60 are exchange biased by a second antiferromagnetic layer 62 that also lies outside of the MTJ track width boundaries. The exchange bias layer 62 pins or fixes the magnetization direction of lateral portions 60b of the free layer 60. The magnetization direction resulting from this pinning is shown by the arrows 61 in FIG. 6, and is generally parallel to the sensor surface 43, in the track width direction of the sensor 42. Without pinning the free layer lateral portions 60b, magnetic instability and hysteresis will degrade the performance of the active free layer region of the MTJ 53.

Turning now to FIG. 5, front and back edges of the MTJ 53 respectively lie along lines 64 and 66, which together form the MTJ stripe height boundaries SH. The line 64 defines the front edge 68 of the pinned layer 56 and the front edge 70 of the barrier layer 58. The line 66 defines the back edge 72 of the pinned layer 56 and the back edge 74 of the barrier layer 58. The front and back edges of the free layer central portion 60a are also respectively defined by the lines 64 and 66.

It will be seen in FIG. 5 that there are portions of the free layer 60 that extend beyond the stripe height boundaries of the MTJ 53. In particular, there is a free layer forward portion 60c that extends forwardly of the line 64 to the sensing surface 43 and a free layer rear portion 60d that extends rearwardly of the line 66. The free layer forward portion 60c defines a front section of a flux guide 76. The free layer rear portion 60d defines a rear section of the flux guide 76. The free layer central portion 60a, in addition to forming the active free layer region of the MTJ 53, may also be thought of as defining a central portion of the flux guide 76. It should also be noted that free layer forward and rear portions 60c and 60d are magnetically responsive (active) regions of the sensor 42 that are exchanged biased by the free layer lateral portions 60b, just as the free layer central portion 60a is biased. Collectively, these free layer portions 60a, 60c and 60d provide the active free layer region of the flux guide 76.

The flux guide 76 directs magnetic flux from the sensing surface 43 to the MTJ 53. As can be seen in FIGS. 4 and 6, and as described in more detail below, the track width of the flux guide 76 and the MTJ 53 are substantially equal, such that magnetic flux is not diluted upon leaving the flux guide.

It will be seen in FIG. 5 that the back edge of the rear section of the flux guide 76, shown at 78, is located rearwardly of the line 66. As taught in the '547 patent described by way of background above, this configuration is advantageous because the magnetic flux propagating in a shielded flux guide decays to zero at the rearward edge of the guide. Extending the back edge 78 beyond the line 66 ensures that the flux at the back edges 72 and 74 of the pinned and barrier layers 56 and 58 will have a finite value. This allows for a greater signal in the active sensing region of the sensor 42 because the flux decays to zero at a point beyond the active sensing region. It should be further noted that the back edges 72 and 74 of the pinned and barrier layers 56 and 58 need not be coplanar, as shown in FIG. 5, so long as the back edge 78 of the flux guide 68 is disposed rearwardly of whichever one of the back edges 72 and 74 is closer to the sensing surface 43.

Completing the configuration of the sensor 42 are pair of insulating layers 80 and 82, as shown in FIG. 5. The insulating layer 80 is formed on the antiferromagnetic layer 54 and extends in height to at least the top of the barrier layer 58. It includes a forward portion 80a that extends forwardly from the line 64 to the sensing surface 43, a rear portion 80b that extends rearwardly of the line 66, and a pair of lateral portions 80c that extend laterally outside of the track width boundaries TW (as shown in FIGS. 4 and 6). The insulating layer 82 is formed over the rear portion 80b of the insulating layer 80. It extends rearwardly of the flux guide back edge 78.

With reference now to FIG. 6, during operation of the disk drive 2, a sense current I is directed from the bottom lead layer 50 and/or the S1 shield layer 48 perpendicularly through the antiferromagnetic layer 54, the pinned layer 56, the barrier layer 58, the free layer central portion 60a, and then out through the top lead layer 52 and/or the S2 shield layer 36. As described by way of background above, the amount of tunneling current through the barrier layer 58 is a function of the relative orientations of the magnetizations of the pinned layer 56 and the free layer central portion 60a that are adjacent to and in contact with the barrier layer 58. The magnetic fields produced by information recorded on the disk 10 are carried to the MTJ 53 by the flux guide 76, and cause the magnetization direction of the free layer central portion 60a to rotate away from the direction 61a, i.e., either into or out of the plane of FIG. 6. This changes the relative orientation of the magnetic moments of the MTJ pinned and free layers, and thus the amount of tunneling current in the MTJ barrier layer. This is reflected as a change in electrical resistance in the sense circuit of the sensor 42 and is interpreted by the drive electronics to produce useful read-back information.

Figure 7:
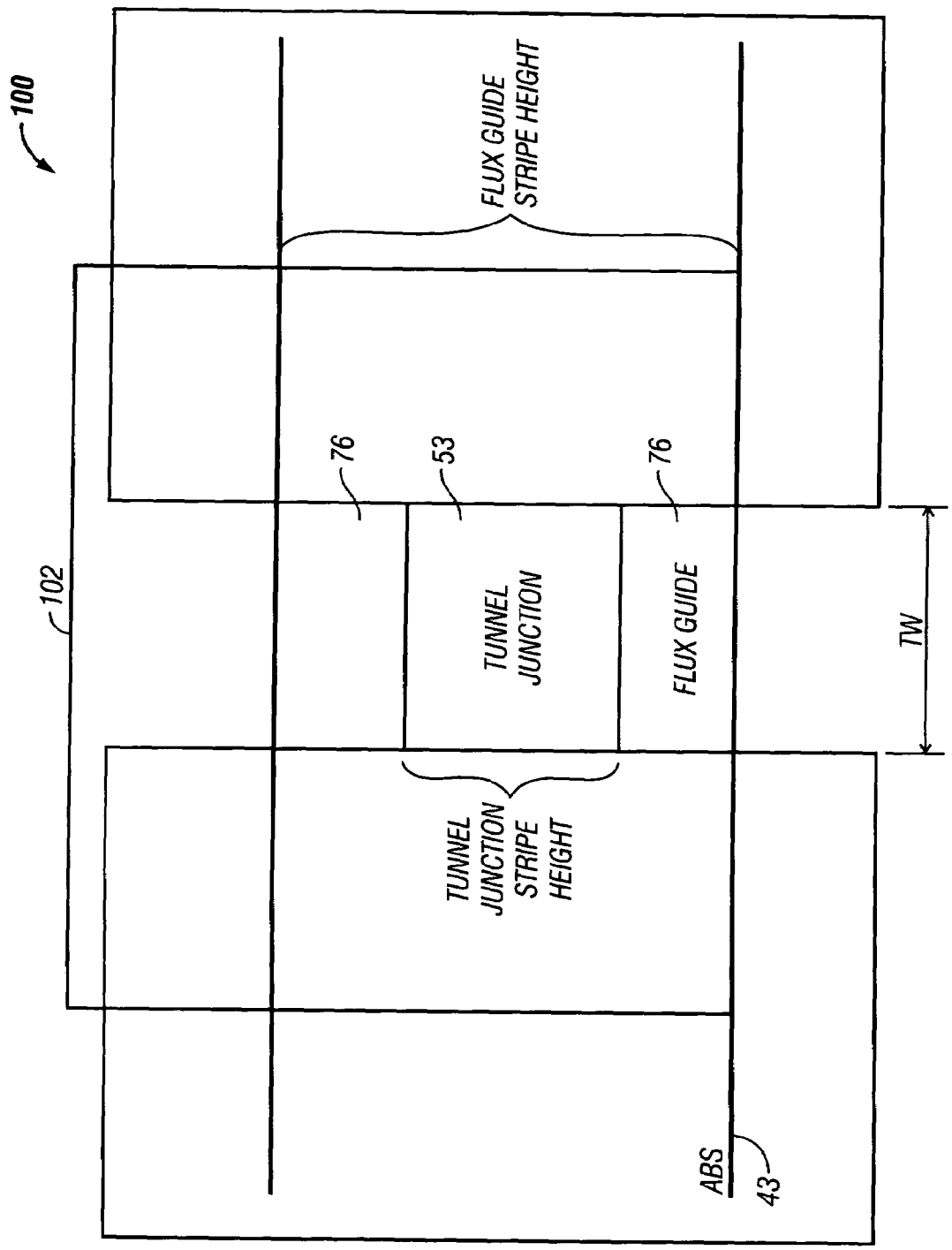
FIG. 7 is a schematic plan view showing the sensor stripe height and track width geometries thereof laid out on a full wafer starting material prior at an initial stage of sensor fabrication.

Turning now to FIG. 7, an exemplary process is shown for fabricating the sensor 42 as part of the transducer 22. This process begins with the formation of a full wafer@ 100 that will typically be large enough to hold a plurality of the transducers 22, each having a sensor 42 therein. In FIG. 7, the outline 102 of a single sensor 42 of a single transducer 22 is shown on the full wafer 100. The full wafer itself will be understood to encompass not only the entirety of the drawing sheet, but to extend substantially beyond the perimeter of the drawing sheet so as to carry the plural other transducers 22 with sensors 42, all of which are preferably constructed in a single batch fabrication process. FIG. 7 further shows the outline of the MTJ 53, the flux guide 76, the MTJ and flux guide stripe heights and track widths, and the sensing surface 43.

Figure 8:
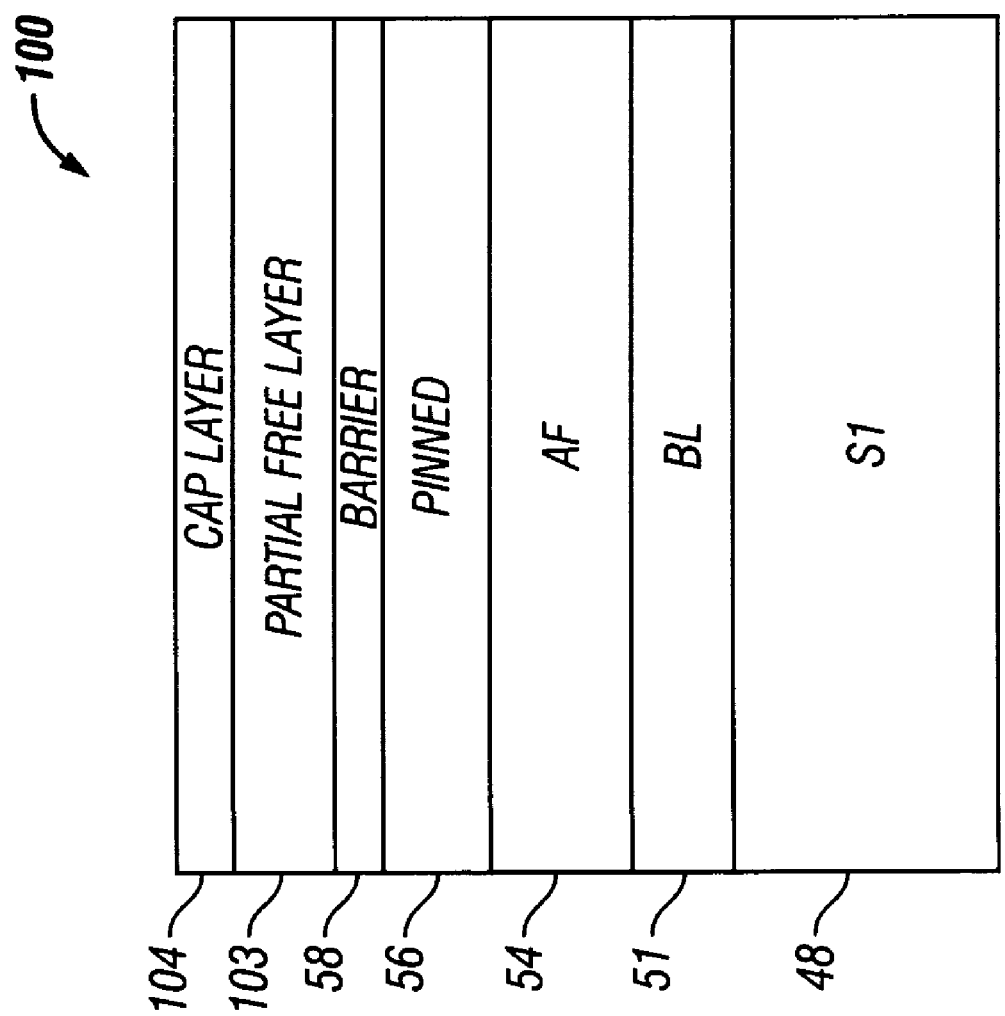
FIG. 8 is a side view of a sensor outline portion of the full wafer starting material of FIG. 7, looking toward the sensing surface side of the wafer.
Figure 9:
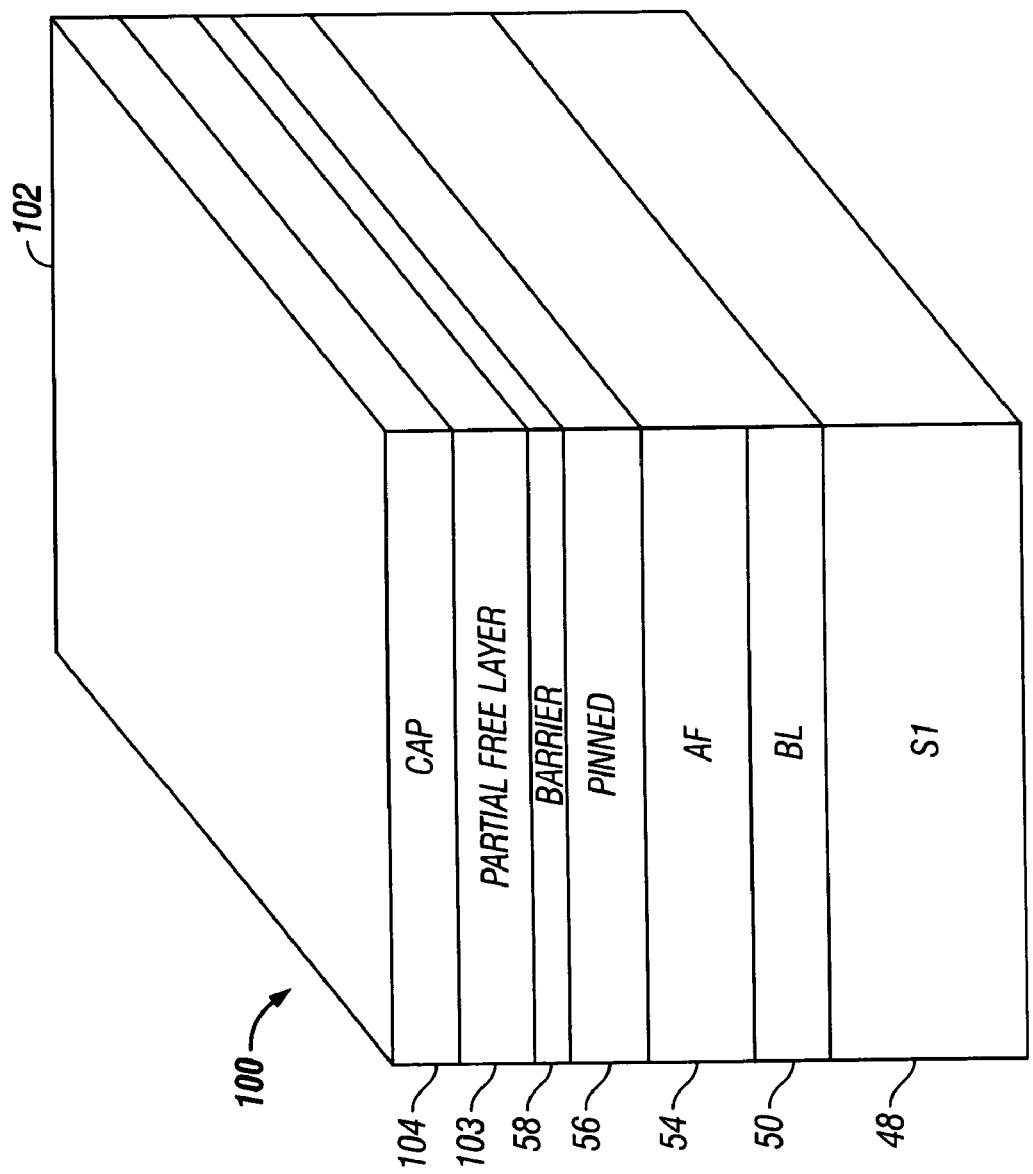
FIG. 9 is a perspective view of a sensor outline portion of the full wafer starting material of FIG. 7, looking toward the sensing surface side of the wafer.

FIGS. 8 and 9 respectively show side and perspective views of the portion of the full wafer 100 that lies within the sensor outline 102 of FIG. 7. Note that the front vertical surface of the wafer 100 represents what will become the ABS or sensing surface 43. However, this surface does not actually exist until lapping is subsequently performed during final processing. As can be seen, the wafer 100 includes the S1 shield layer 48, the optional bottom lead layer 50, the antiferromagnetic layer 54, the pinned layer 56, the barrier layer 58, a partial free layer 103 representing a sub-layer portion of the free layer 60, and a cap layer 104. Unless otherwise indicated below, these layers are formed using materials and fabrication techniques that are conventionally known relative to the manufacture of thin film heads.

Construction of the wafer 100 begins with the formation of a flat substrate (not shown) made from N58, silicon, a semiconductor, or other suitable material, to provide a base for the remaining layers. The S1 shield layer 48 is the first layer formed on the substrate. Optionally, the S1 shield layer 48 itself may itself provide a suitable substrate for the device. It is constructed by forming a suitably thick deposit of electrically conductive ferromagnetic material, such as Ni—Fe (permalloy), Ni—Fe—Co, Sendust, a cobalt, zirconium-niobium alloy, etc. Deposition of the S1 shield layer 48, as well as the remaining layers of the wafer 100, can be performed using any suitable thin film deposition process, including ion beam deposition, RF or DC magnetron sputtering, etc.

After formation of the S1 shield layer 48, the optional bottom lead layer 50 can be formed thereon by depositing a 0–50 nm layer of Au, Pt or other suitable conductive material. At this point, a mild magnetic field (20–100 Oe) can be optionally applied parallel to the plane of the S1 shield layer 48 and the bottom lead layer 50, in order to align the easy axis of the ferromagnetic layers that are next to be grown, if such alignment is desired.

After depositing one or more conventional seed and/or template layers (not shown) onto the bottom lead layer 50 (or the S1 shield layer 48), the antiferromagnetic layer 54 is deposited to a thickness of about 10 nm using Fe—Mn, Ni—Mn, Pt—Mn, IrMn, or other suitable antiferromagnetic material that is capable of exchange biasing the ferromagnetic material in the pinned layer 56, and which has a resistance that is substantially less than that of the barrier layer 58.

The pinned layer 56 is formed by growing a layer of Co, CoFe, Ni—Fe (permalloy) or other suitable ferromagnetic material on top of the antiferromagnetic layer 54 to a thickness of about 1–8 nm. Note that the pinned layer 56 will have its magnetic moment fixed by interfacial exchange coupling with the antiferromagnetic layer 54. In an alternative configuration, the pinned layer can be comprised largely of a bulk $Ni_{(100-x)}Fe_{(x)}$ layer with a thin 1–2 nm layer of a Co or $Co_{(100-x)}Fe_{(x)}$ or $Ni_{(100-x)}Fe_{(x)}$ (x is approximately 60) material at the interface with the barrier layer 58. Note that the net magnetostriction of the combined pinned layer 56 is preferably arranged to be close to zero by making small variations to the composition to the bulk of the pinned layer.

In a further alternative configuration, the pinned layer 56 can be formed of a magnetically Ahard@ high coercivity material, thereby avoiding the need for the antiferromagnetic layer 54. A hard pinned ferromagnetic layer of this type could be formed from a variety of ferromagnetic materials, such as alloys of Co and one or more other elements, including Co—Pt—Cr alloys, Co—Cr—Ta alloys, Co—Sm alloys, Co—Re alloys, Co—Ru alloys, and Co—Ni—X alloys (where X=Pt, Pd, or Cr), as well as a variety of quaternary alloys, such as Co—Ni—Cr—Pt and Co—Pt—Cr—B.

The barrier layer 58 is about 0.5–2 nm thick and typically contains $Al_2O_3$, AlN, MgO, TaO, GaO or combinations of these materials. The barrier layer 58 is then covered with Co, Ni—Fe or other suitable ferromagnetic material to form the partial free layer 103. An alternative partial free layer can be formed from a thin $Co_{(100-x)}Fe_{(x)}$, or $Ni_{(100-x)}Fe_{(x)}$ (x is approximately 60) layer at the interface with the barrier layer 58, with the bulk of the partial free layer 103 being a low magnetostriction material, such as $Ni_{(100-x)}Fe_{(x)}$ (x is approximately 19). Note that the net magnetostriction of this type of partial free layer 103 is preferably arranged to have a value close to zero by making slight variations to the composition of the bulk of the partial free layer.

The cap layer 104 is formed on top of the partial free layer 103 as a thin layer of Ta, Rh or other suitable material. The purpose of the cap layer 104 is to protect the barrier layer 58 against inadvertent etching during subsequent processing.

Figure 10:
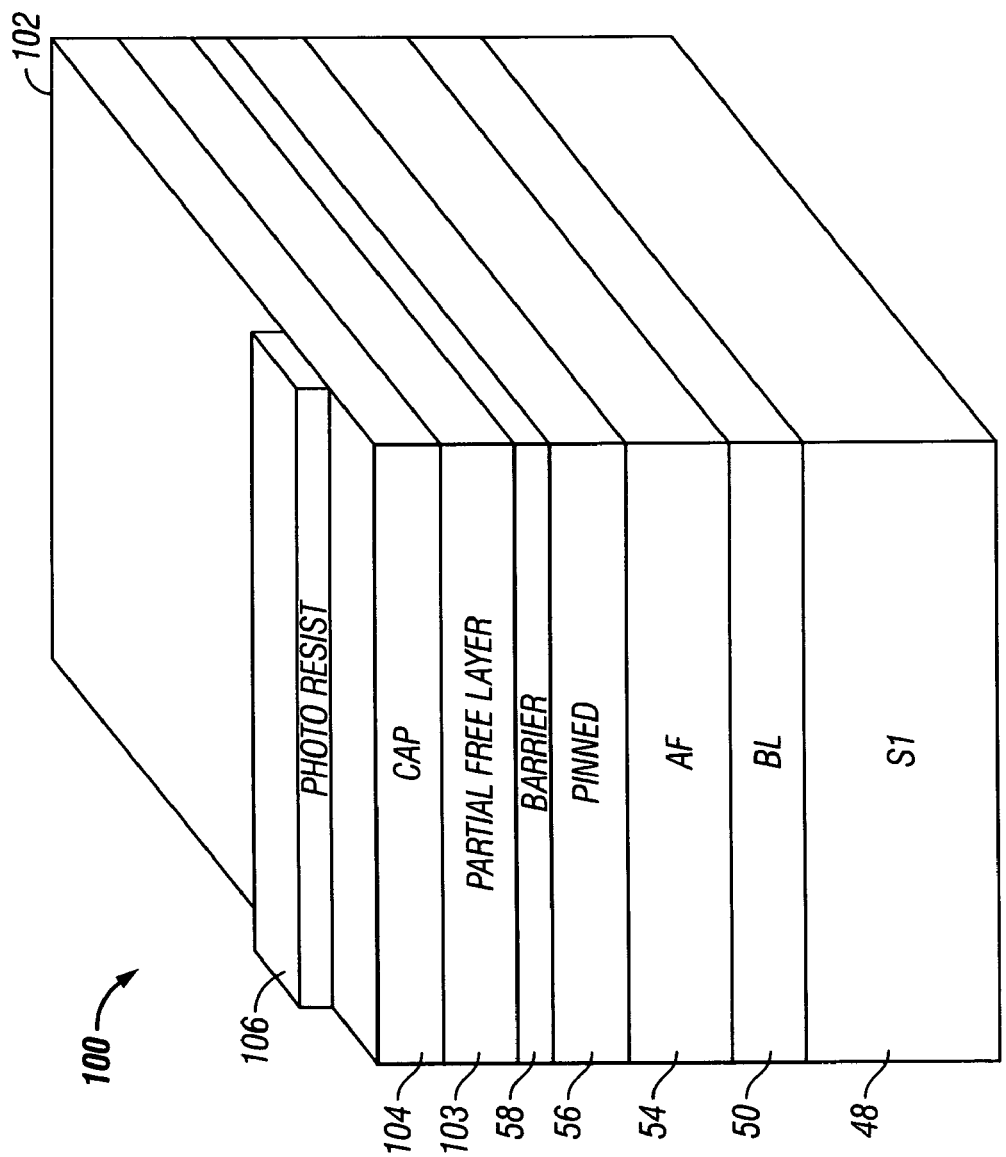
FIG. 10 is a perspective view according FIG. 9 after a photoresist layer is deposited thereon to define MTJ stripe height geometry.

With the wafer 100 formed in the above-described manner, the next step in the sensor fabrication process is to define the stripe height of the MTJ 53. As shown in FIG. 10, a photoresist layer is applied over the wafer 100 and patterned to form the photoresist mask 106. The photoresist mask 106 is preferably formed using a conventional bilayer photoresist process with photolithographic masking and solvent development to form an undercut (not shown) that facilitates subsequent liftoff.

Figure 11:
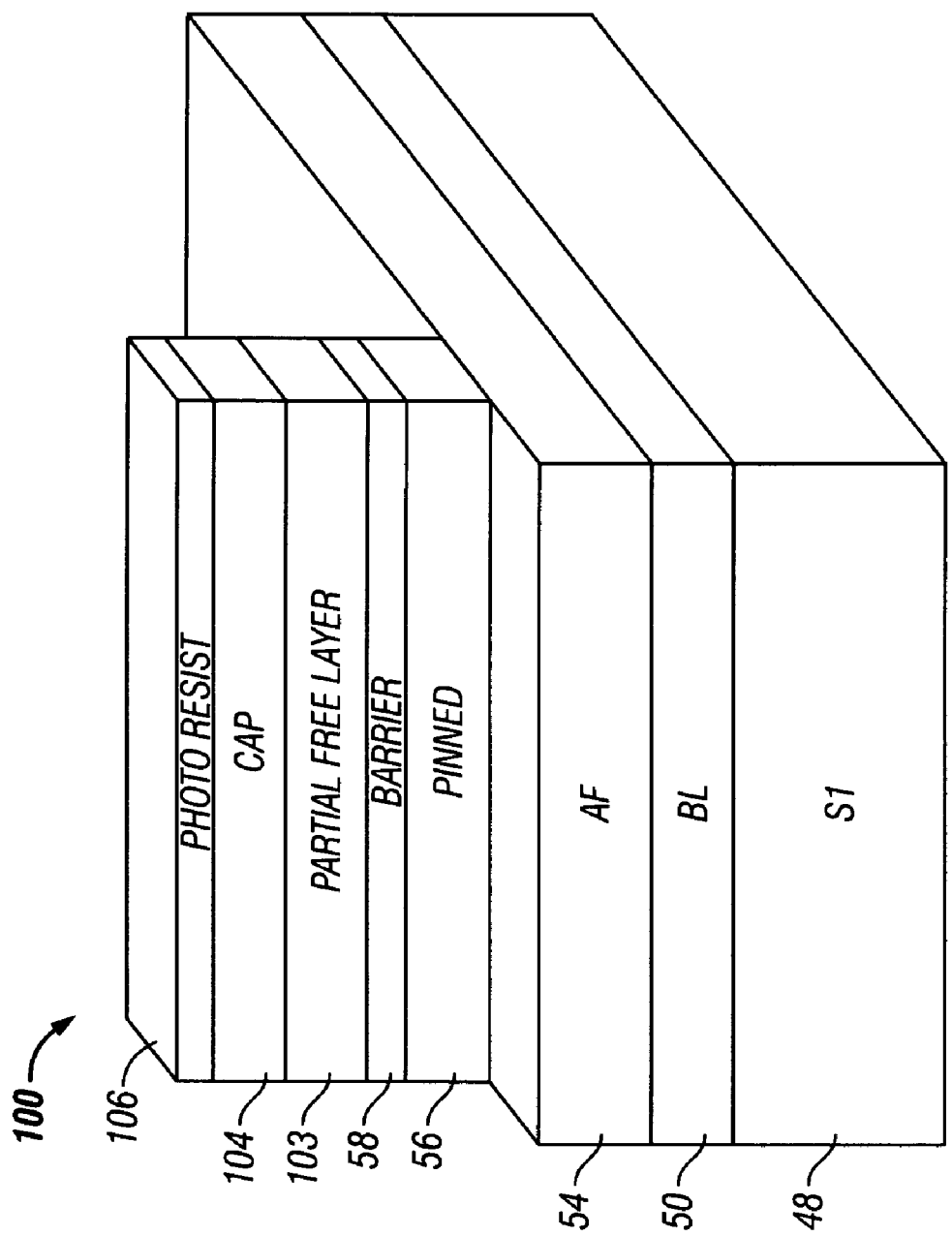
FIG. 11 is a perspective view according to FIG. 10 after removing material outside the MTJ stripe height region down to an antiferromagnetic layer.
Figure 12:
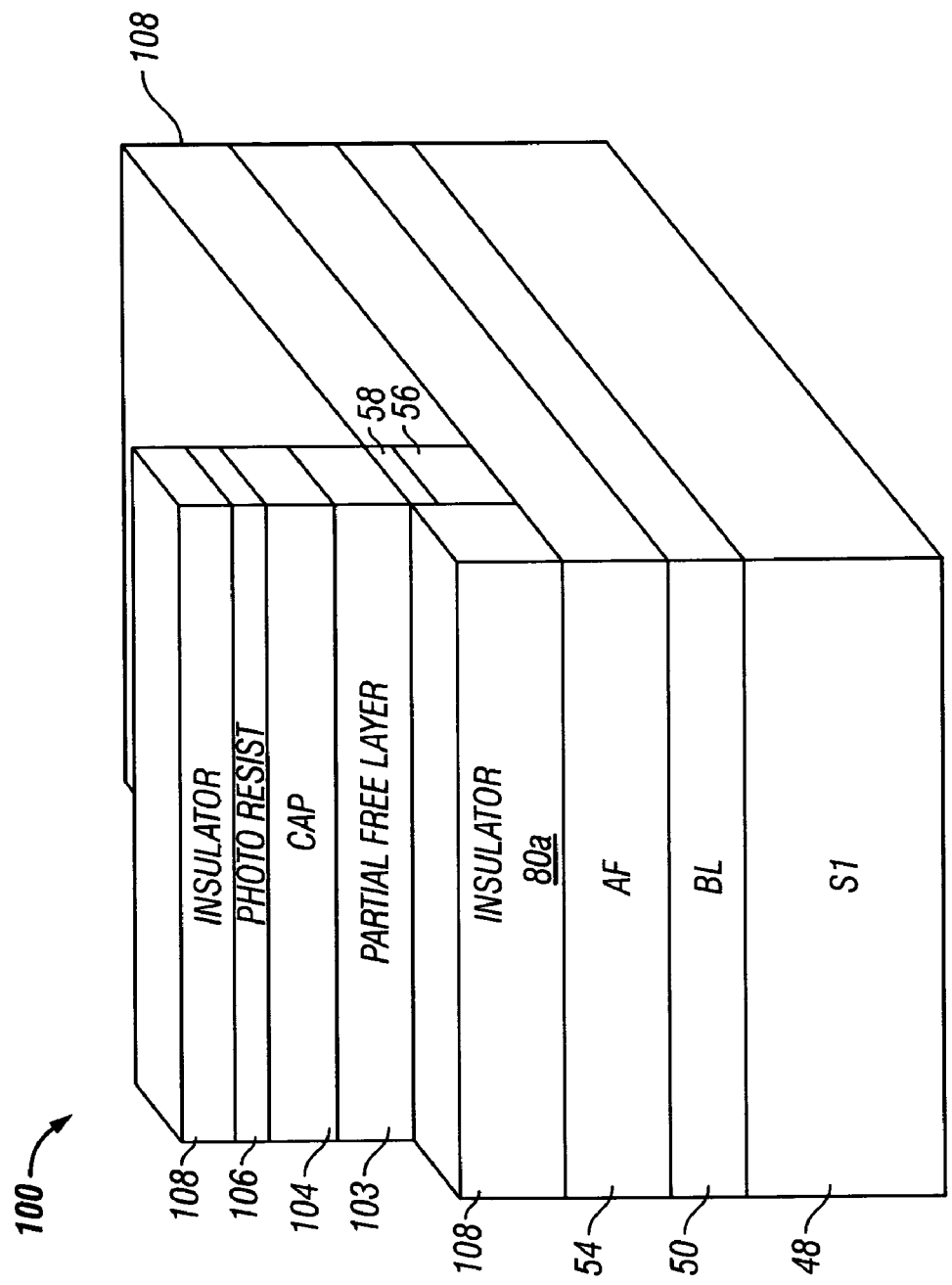
FIG. 12 is a perspective view according to FIG. 11 after depositing an insulating layer full wafer.
Figure 13:
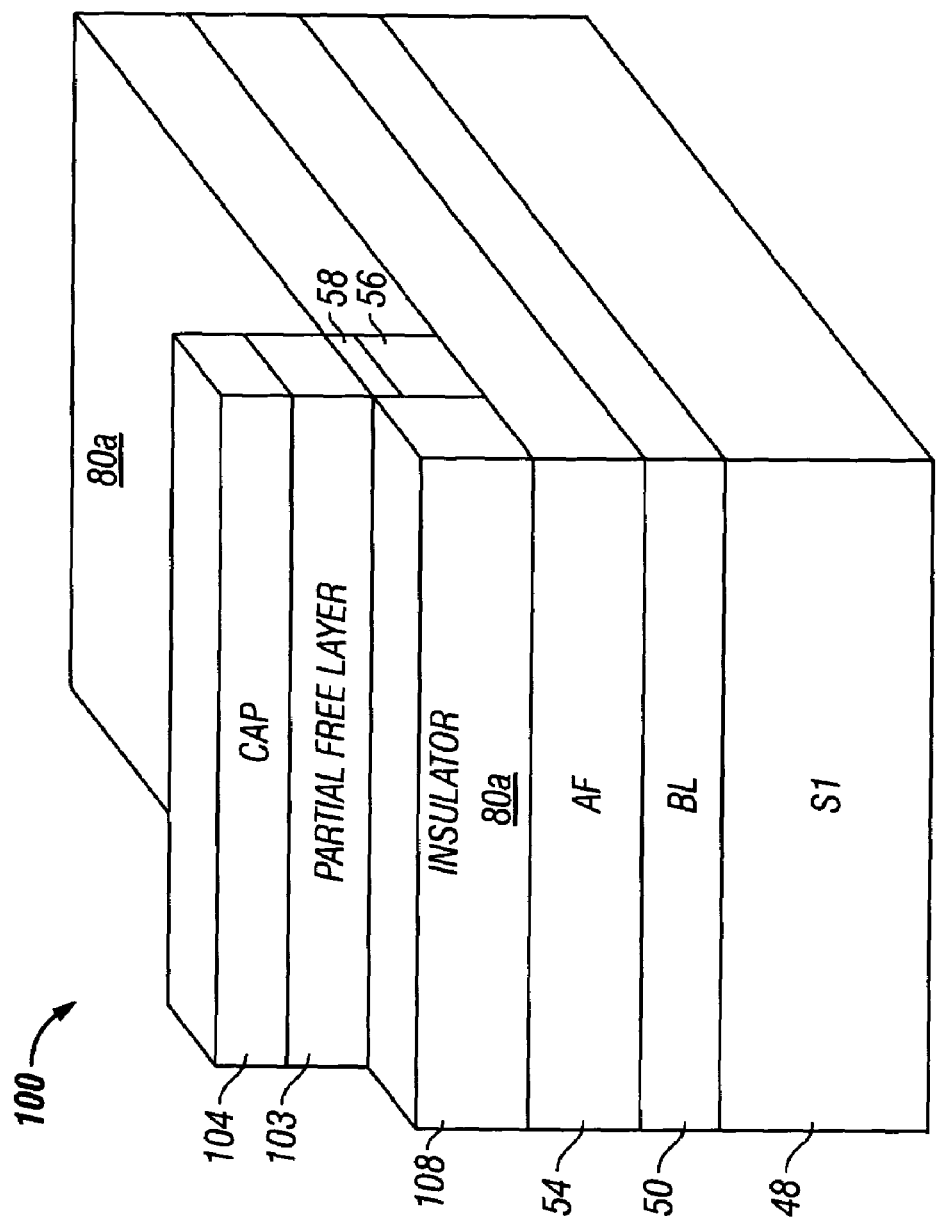
FIG. 13 is a perspective view according to FIG. 12 after removal of the MTJ stripe height-defining photoresist layer.

In FIG. 11, the wafer 100 is milled down to past the barrier layer 58 (milling may stop anywhere after reaching this point) to remove material outside of the photoresist mask 106. In FIG. 12, insulating material 108 is deposited full wafer to form part of the insulating layer 80, namely, the forward and rearward portions 80a and 80b. Any suitable electrically insulating material may be used, such as alumina, TaO and $SiO_2$. In FIG. 13, the photoresist mask 106 is removed.

Figure 14:
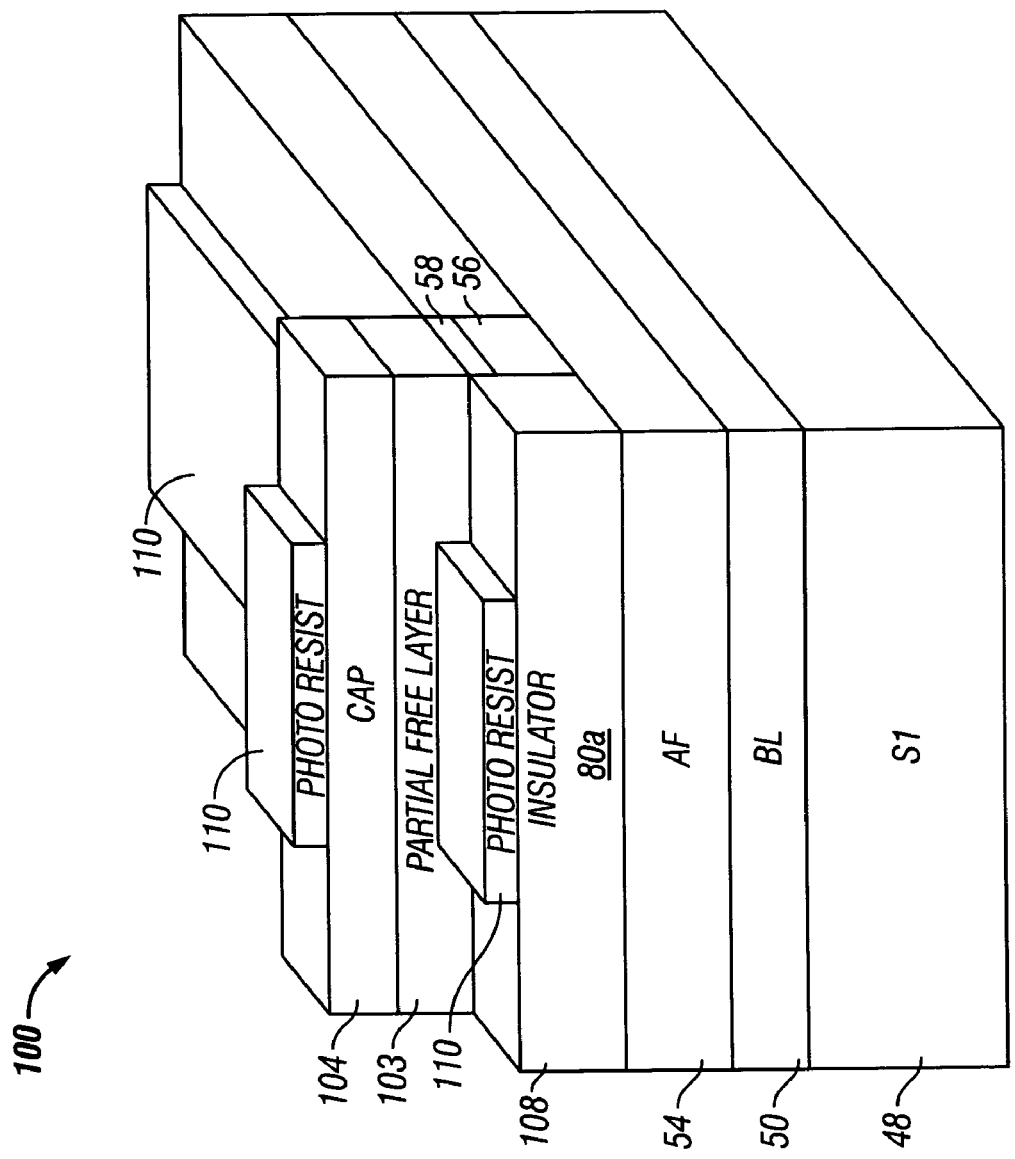
FIG. 14 is a perspective view according to FIG. 13 after a photoresist layer is deposited thereon to define MTJ and flux guide stripe height geometry.

With the MTJ stripe height thus formed, the next step in the sensor fabrication process is to define the MTJ and flux guide track width. As shown in FIG. 14, a photoresist layer is applied over the wafer 100 and patterned to form the mask 110. Like the photoresist mask 106, the photoresist mask 110 is preferably formed using a conventional bilayer photoresist process with photolithographic masking and solvent development to form an undercut (not shown) that facilitate subsequent liftoff.

Figure 15:
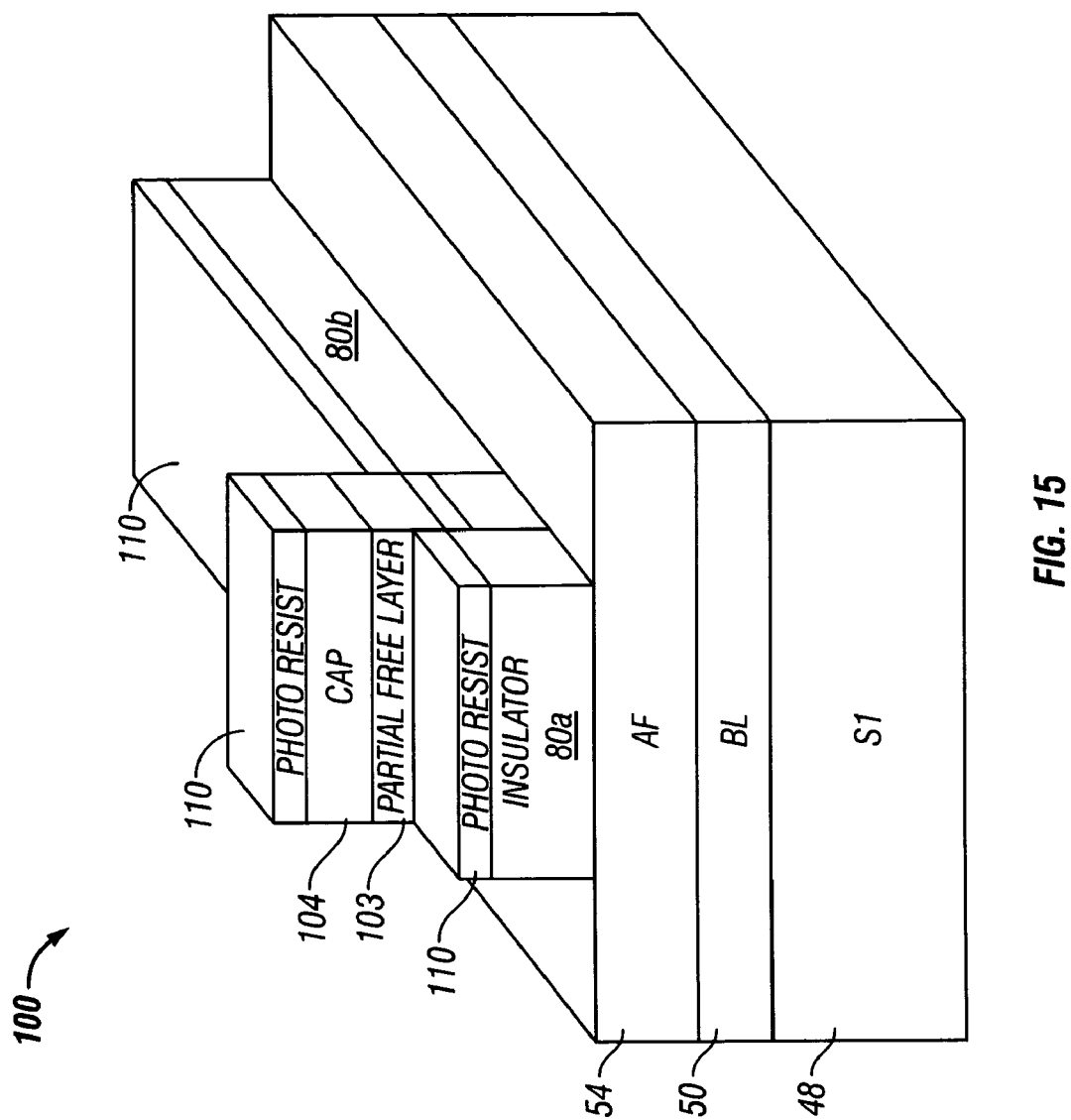
FIG. 15 is a perspective view according to FIG. 14 after removing material outside the MTJ and flux guide track width-defining photoresist layer down to the antiferromagnetic layer.
Figure 16:
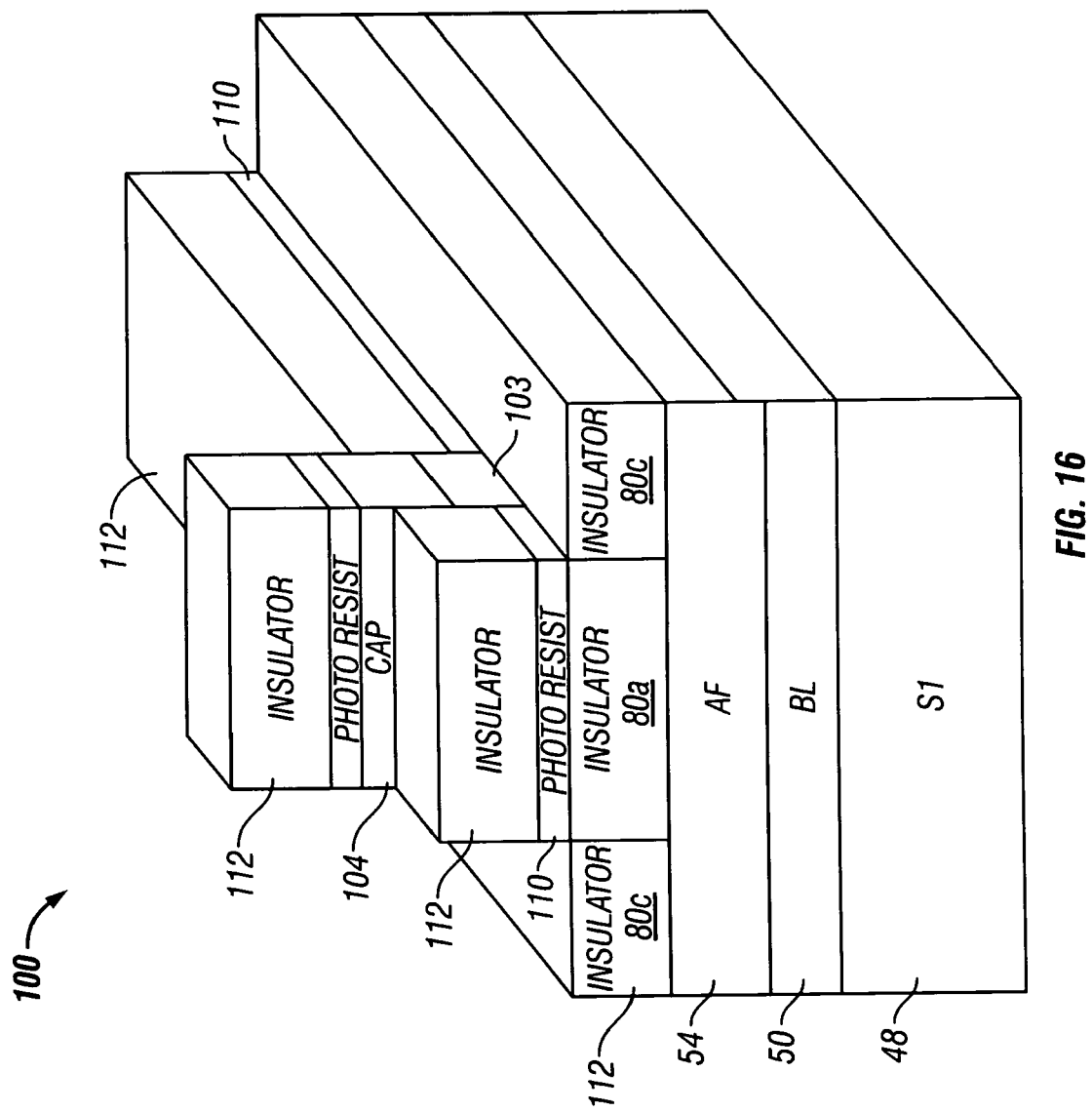
FIG. 16 is a perspective view according to FIG. 15 after depositing an insulating layer full wafer.
Figure 17:
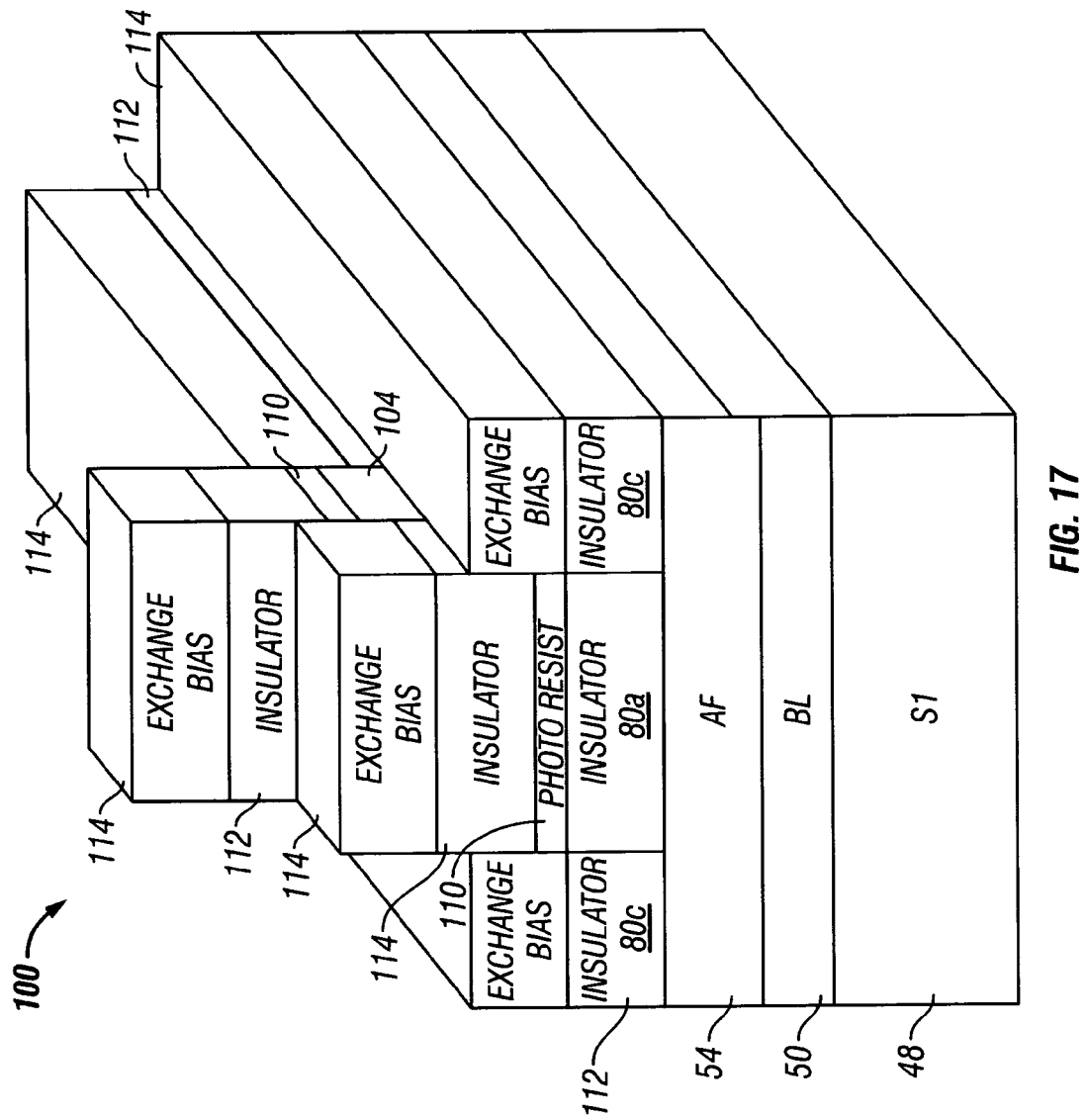
FIG. 17 is a perspective view according to FIG. 16 after depositing an exchange bias layer full wafer.
Figure 18:
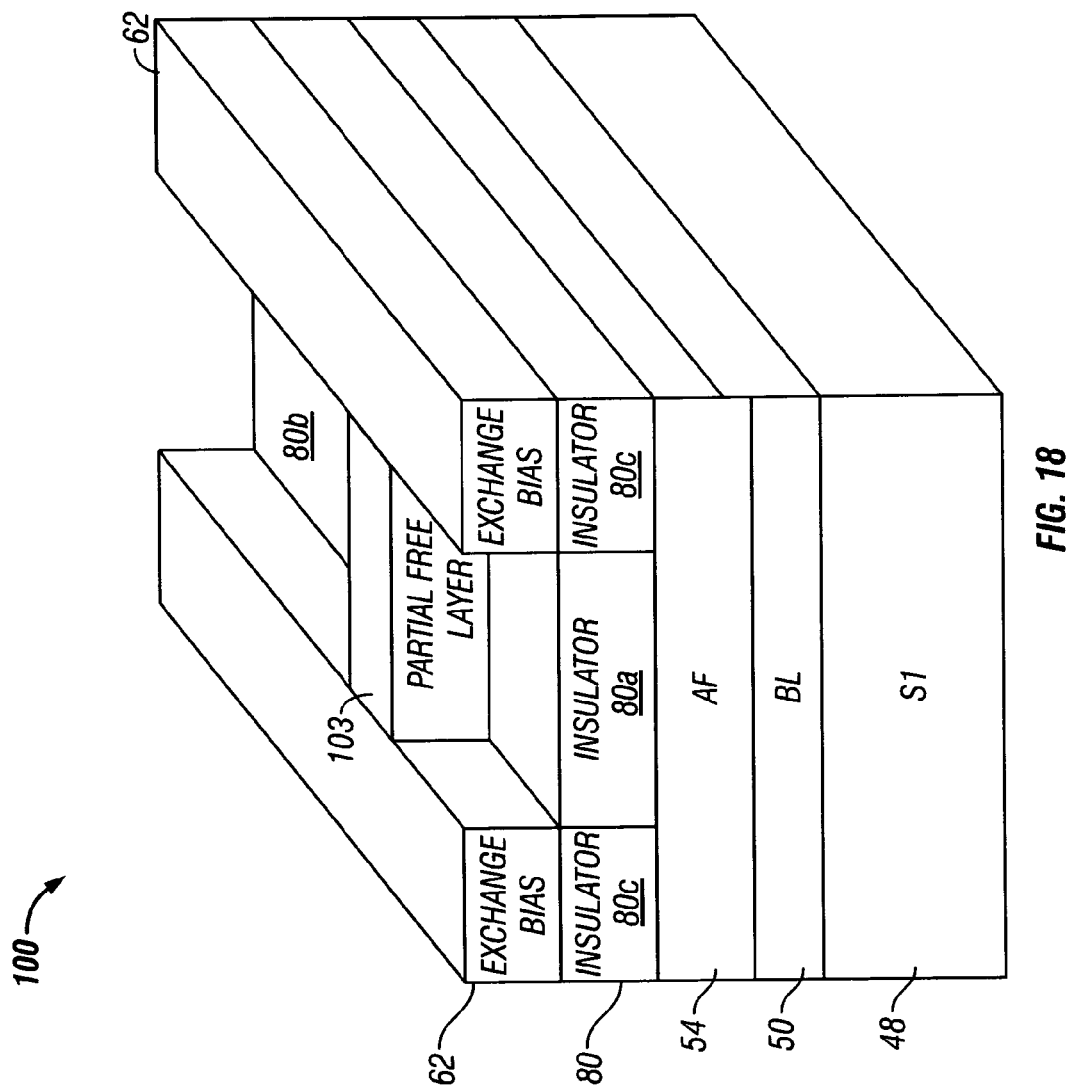
FIG. 18 is a perspective view according to FIG. 17 after removal of the MTJ and flux guide track width-defining photoresist layer and a cap layer of the wafer.
Figure 19:
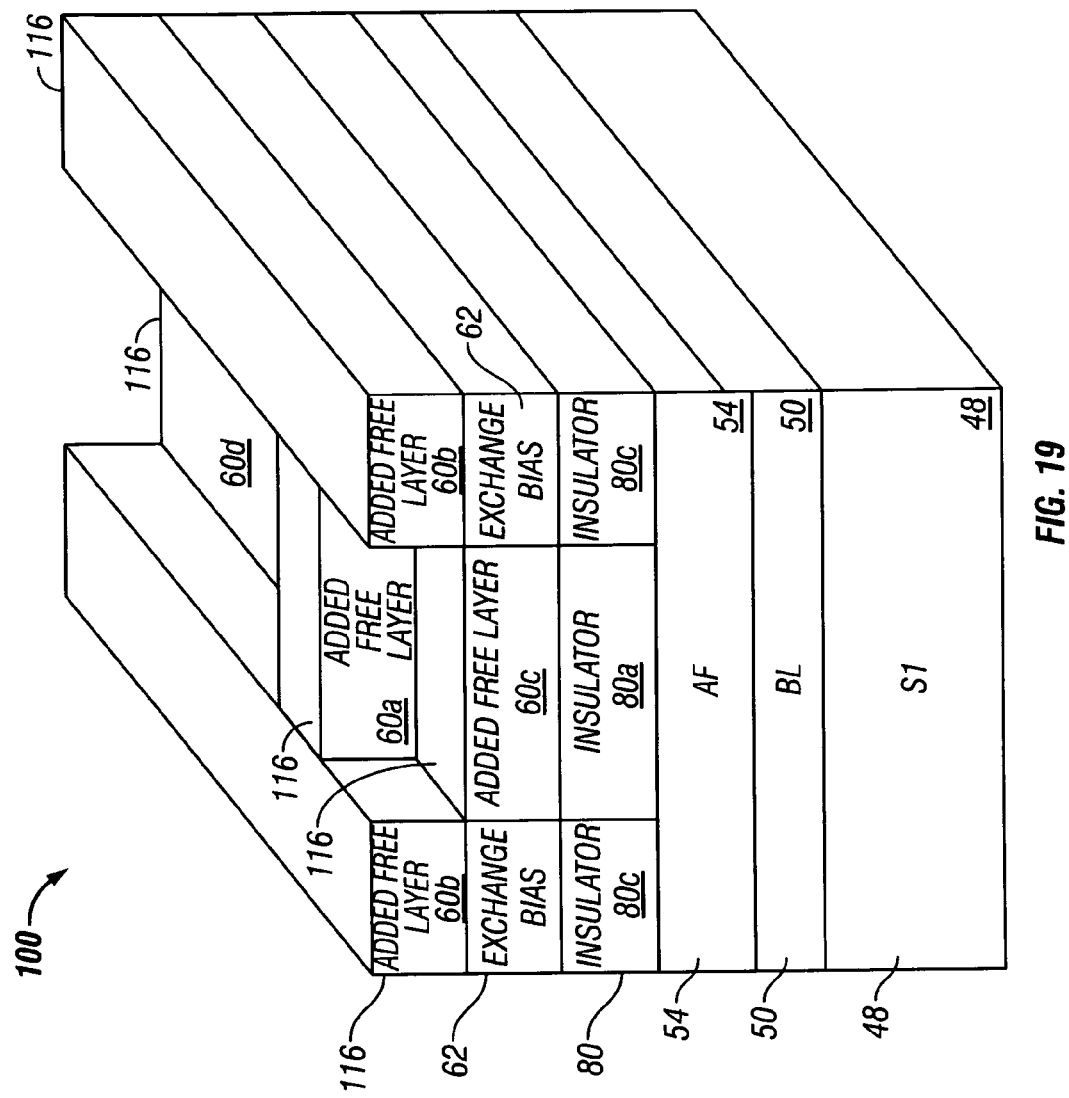
FIG. 19 is a perspective view according to FIG. 18 after depositing additional free layer material full wafer.

In FIG. 15, the wafer 100 is milled through the barrier layer 58 using ion milling or the like to remove material outside of the photoresist mask 110. In FIG. 16, insulating material 112 is deposited full wafer to form a further part of the insulating layer 80, namely, the lateral portions 80c, thereby completing this insulating layer. Again, any suitable electrically insulating material may be used, including alumina, TaO and $SiO_2$. In FIG. 17, exchange bias material 114 is deposited full wafer to form the exchange bias layer 62. In FIG. 18, the photoresist mask 110 is removed. In addition, the cap layer 104 is now removed, preferably by sputter etching, to reveal the previously-deposited partial free layer 103. In FIG. 19, additional free layer material 116 is deposited on the wafer 100 as a top-layer portion of the free layer 60 to complete the deposition of material forming the free layer portions 60a, 60b, 60c and 60d.

Figure 20:
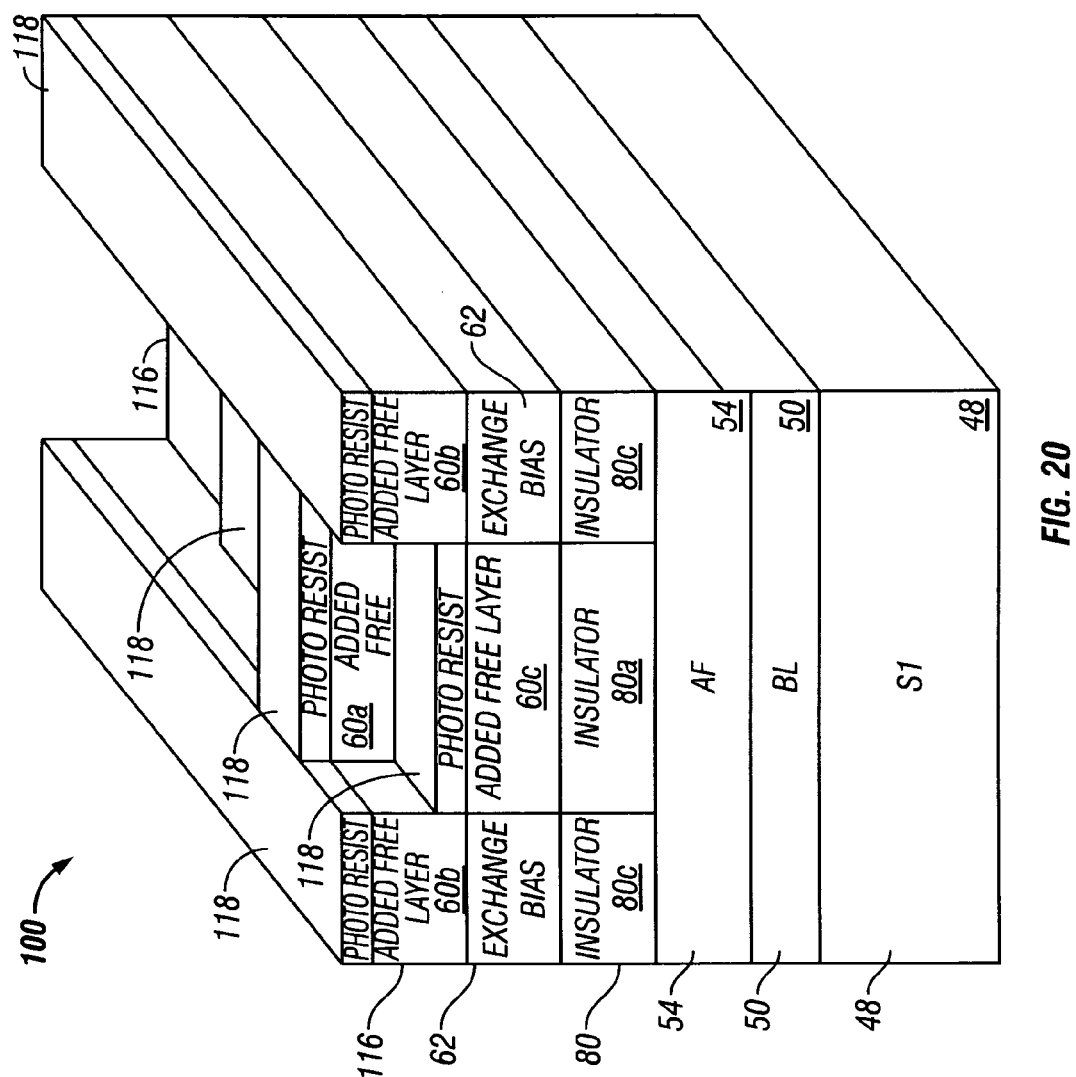
FIG. 20 is a perspective view according to FIG. 19 after a photoresist layer is deposited to define flux guide rearward edge geometry.

With the MTJ and flux guide track width thus defined, the next step in the sensor fabrication process is to define the rearward edge 78 of the flux guide 76 and then perform a lapping operation to define the sensing surface 43. In FIG. 20, a photoresist layer is applied over the wafer 100 and patterned to form the mask 118. Like the photoresist masks 106 and 110, the photoresist mask 118 is preferably formed using a conventional bilayer photoresist process with photolithographic masking and solvent development to form an undercut (not shown) that facilitate subsequent liftoff.

Figure 21:
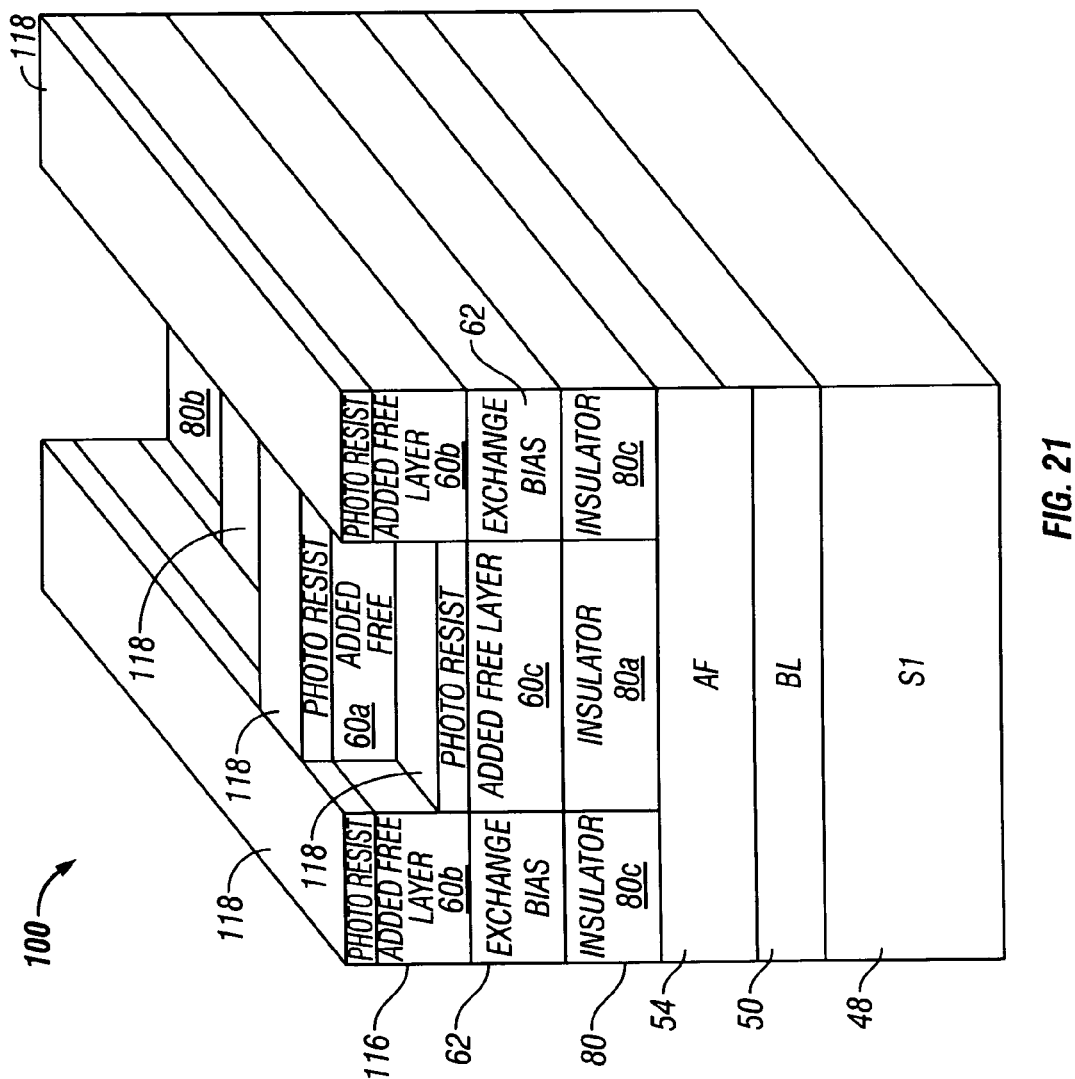
FIG. 21 is a perspective view according to FIG. 20 after removing material outside the flux guide rearward edge-defining photoresist layer down to a previously deposited insulating layer
Figure 22:
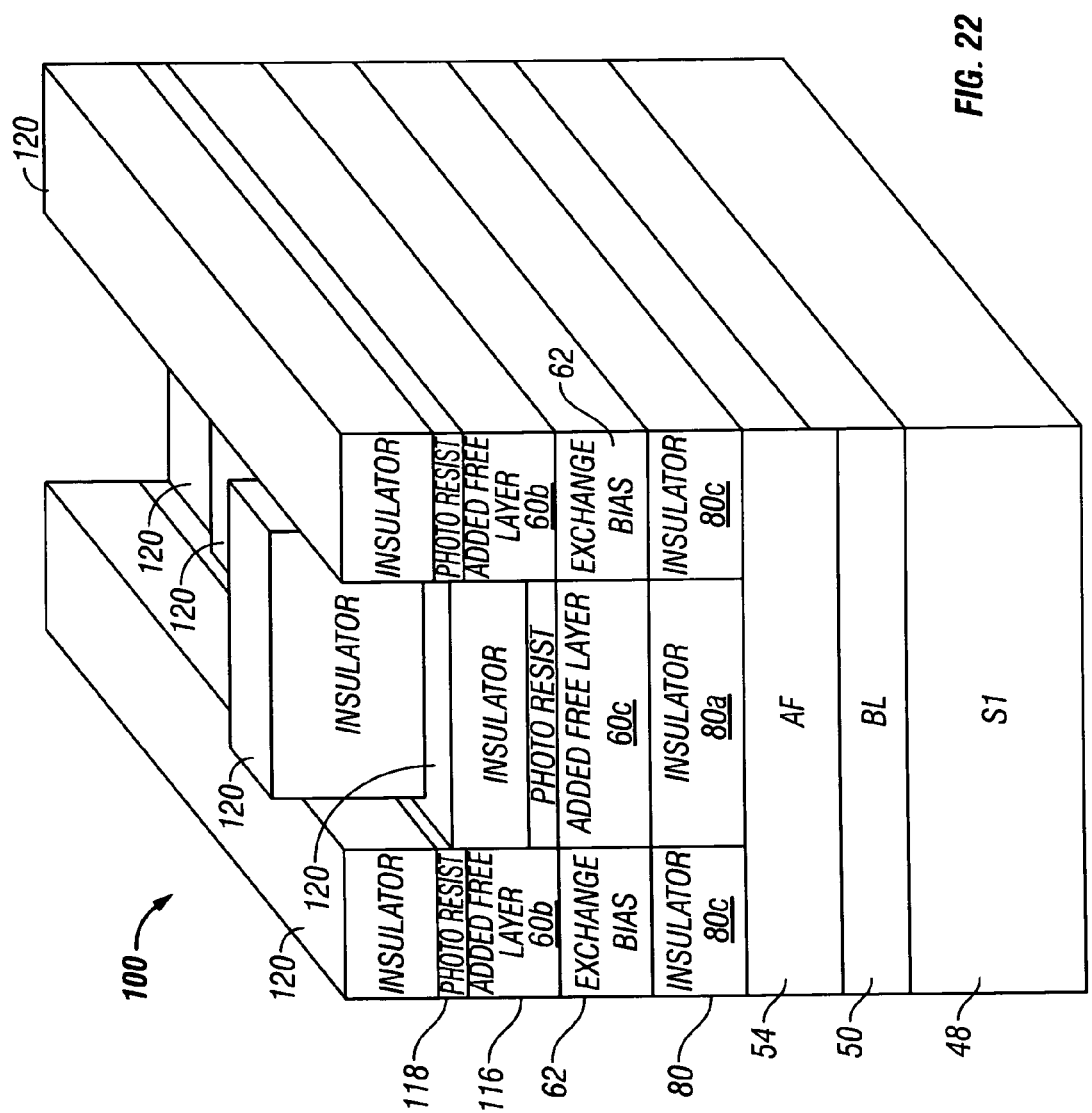
FIG. 22 is a perspective view according to FIG. 21 after depositing insulating material full wafer.
Figure 23:
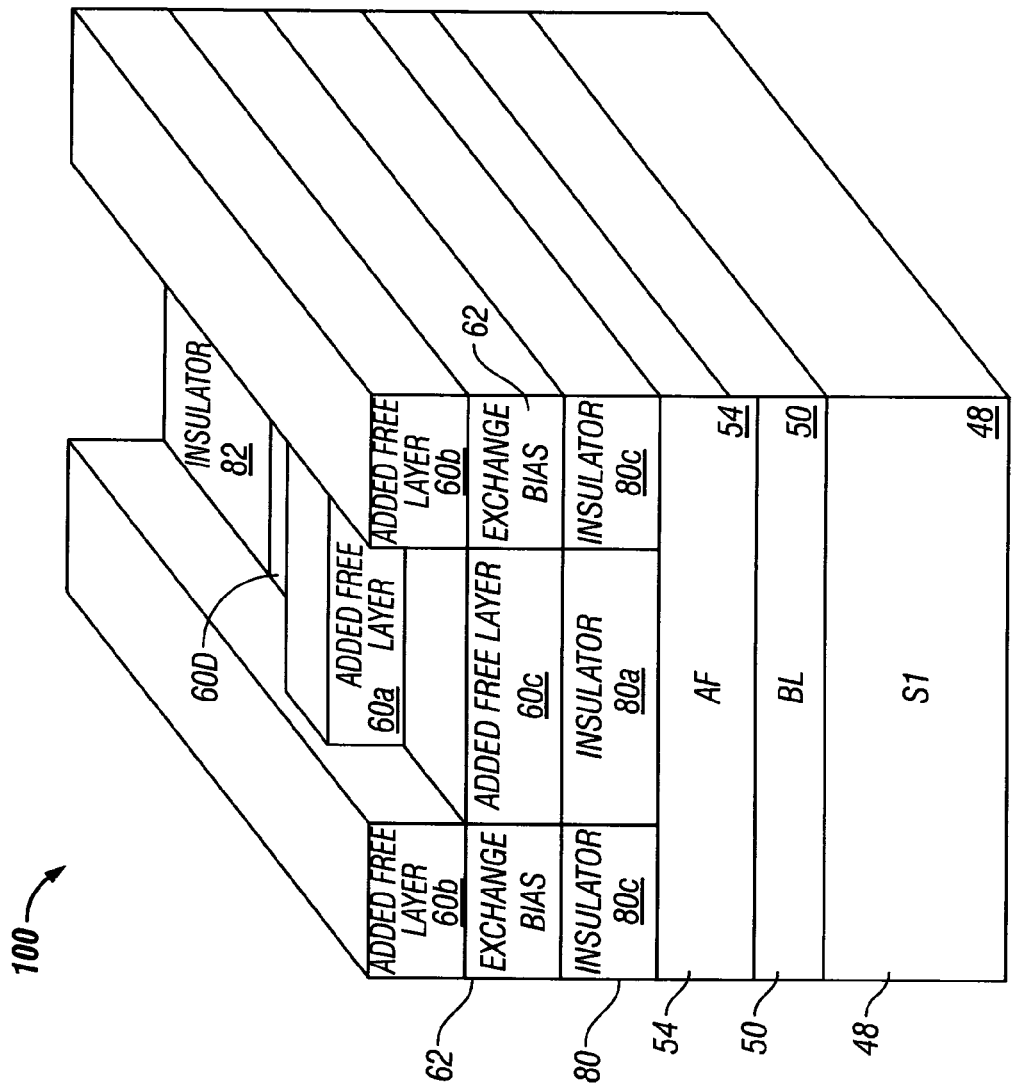
FIG. 23 is a perspective view according to FIG. 22 after removing the flux guide rearward edge-defining photoresist layer.

In FIG. 21, the wafer 100 is milled down to the insulating layer 80 using ion milling or the like to remove material outside of the photoresist mask 118. In FIG. 22, insulating material 120 is deposited full wafer to form the insulating layer 82. Any suitable electrically insulating material may be used, including alumina, TaO and SiO$_2$. In FIG. 23, the photoresist mask 118 is removed.

Figure 24:
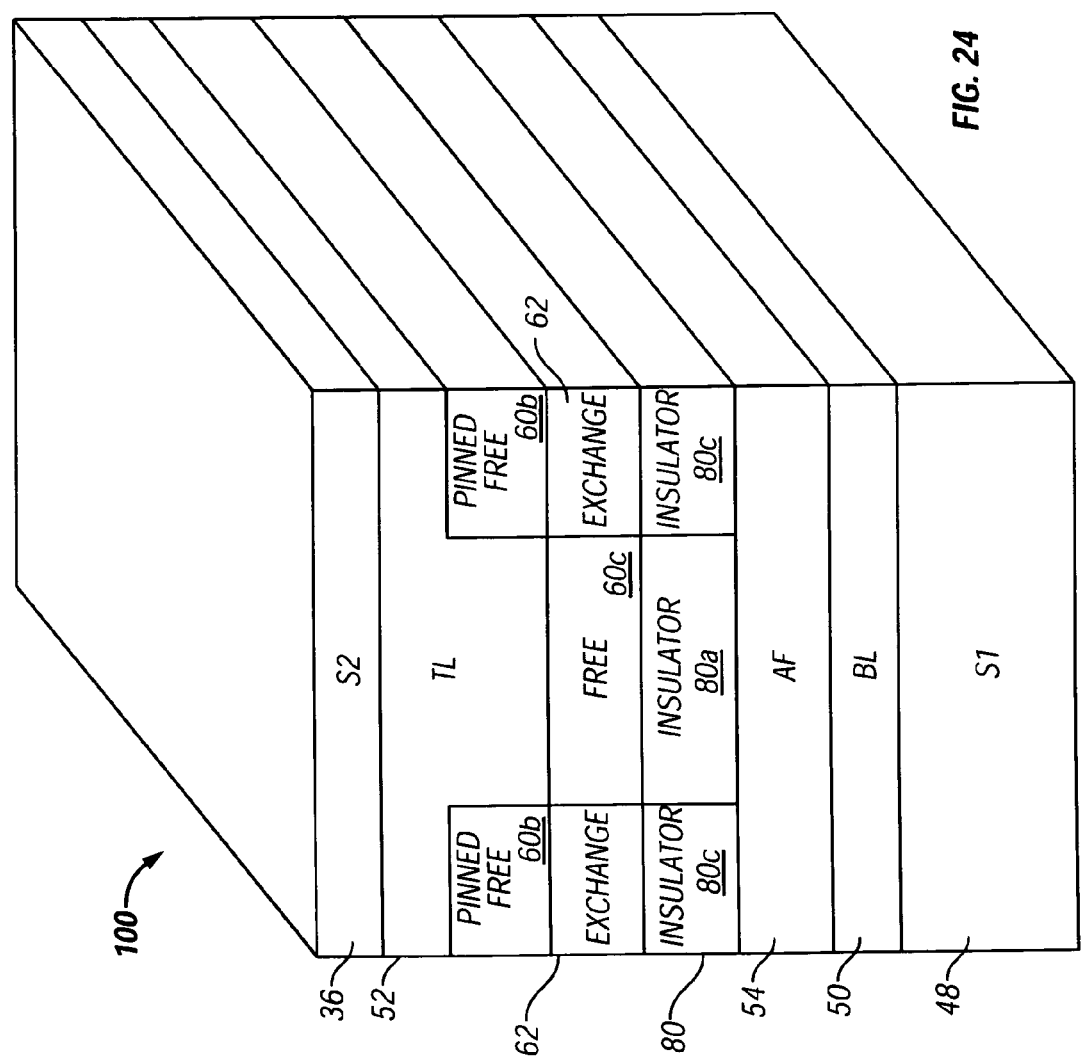
FIG. 24 is a perspective view according to FIG. 23 after adding a top lead layer and a second shield layer.

The final steps of the sensor fabrication process, shown in FIG. 24, are to form the top lead layer 52 (if used), and to then complete the read head 26 by adding the S2 shield 36. These layers can be formed in a manner analogous to the bottom lead layer 50 and the S1 shield layer 48. The remaining structure of the transducer 22 may thereafter be added in conventional fashion.

Accordingly, a magnetoresistive sensor has been disclosed having sensing element and flux guide active free layer regions that are of equal track width and which are longitudinally biased by exchange biasing the free layer outside the track width boundaries. A method of fabricating the sensor has also been disclosed. Advantageously, the sensing element and the flux guide have self-aligned substantially equal track widths such that magnetic flux is not diluted as it travels from the flux guide into the sensing element. In addition, the use of exchange biasing to longitudinally bias the sensing element and flux guide active free layer regions means that the disadvantages of hard biasing referred to by way of background above are avoided.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for fabricating a magnetoresistive sensor having a recessed sensing element and a flux guide formed by an extension of a free layer of the sensing element, the method comprising the steps of:

forming a multi-layer wafer which includes layers that will serve as said sensing element and said flux guide;

said multi-layer wafer forming step including forming a wafer having an antiferromagnetic layer, a pinned layer disposed on said antiferromagnetic layer, a barrier layer disposed on said pinned layer, a partial free sub-layer disposed on said barrier layer at a thickness that is less than a final thickness of a completed free layer to be formed on said barrier layer, and a cap layer; and defining a track width for said sensing element and said flux guide in a single photo processing operation.

2. The method in accordance with claim 1 wherein said sensing element is constructed as one of a magnetic tunnel junction device or a current-perpendicular-to-plane spin valve device.

3. The method in accordance with claim 1 wherein said photo processing operation includes applying a photoresist mask on said wafer to define a self-aligned sensing element and flux guide having active regions disposed between a pair of common track width boundaries that define sensing element and flux guide track widths which are substantially equal to each other.

4. The method in accordance with claim 3 further including removing said cap layer, said free sub-layer, said barrier layer and said pinned layer from areas thereof that are outside of said active regions to expose a corresponding area of said antiferromagnetic layer.

5. The method in accordance with claim 4 further including forming a insulating layer over said exposed area of said antiferromagnetic layer, said insulating layer being of sufficient thickness to cover exposed portions of said pinned layer and said barrier layer along said track width boundaries.

6. The method in accordance with claim 5 further including forming an exchange bias layer over said insulating layer and removing said photoresist mask and said cap layer to expose said free sub-layer within said track width boundaries while leaving said exchange bias layer intact outside of said track width boundaries.

7. The method in accordance with claim 6 further including applying additional free layer material over said wafer, including said free sub-layer and said exchange bias layer, whereby said additional free layer material completes said sensing element and said flux guide active regions within said track width boundaries and provides an exchanged biased free layer outside of said track width boundaries that longitudinally biases said active regions to a selected magnetic orientation in the absence of an external magnetic field.

* * * * *